US007650907B2

(12) United States Patent
Goto et al.

(10) Patent No.: US 7,650,907 B2
(45) Date of Patent: Jan. 26, 2010

(54) HYDRAULIC CONTROL APPARATUS

(75) Inventors: Tetsuya Goto, Kariya (JP); Takeharu Matsuzaki, Kariya (JP); Shigeto Nakajima, Nagano (JP); Tadashi Noguchi, Nagano (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 353 days.

(21) Appl. No.: 11/894,508

(22) Filed: Aug. 20, 2007

(65) Prior Publication Data

US 2008/0053304 A1 Mar. 6, 2008

(30) Foreign Application Priority Data

Aug. 21, 2006 (JP) ............................ 2006-224053

(51) Int. Cl.
*F16K 11/07* (2006.01)

(52) U.S. Cl. .................................... 137/625.69; 91/446

(58) Field of Classification Search ................. 137/494, 137/497, 498, 625.2, 625.67, 625.25, 625.65, 137/625.69; 251/30.01, 30.02; 91/445, 446
See application file for complete search history.

(56) References Cited

U.S. PATENT DOCUMENTS 6,786,132 B2 9/2004 Albert et al.
2008/0302098 A1 12/2008 Matsuzaki et al.

FOREIGN PATENT DOCUMENTS

| | | | |
|---|---|---|---|
| EP | 1331199 | A2 | 7/2003 |
| JP | 2000-179504 | A | 6/2000 |
| JP | 2006-132680 | | 5/2006 |
| WO | WO 2006/049344 | | 5/2006 |

OTHER PUBLICATIONS

European Search Report for Application No. EP 07 11 4596, dated Jul. 28, 2009.

*Primary Examiner*—John Rivell
*Assistant Examiner*—Craig M Schneider
(74) *Attorney, Agent, or Firm*—Locke Lord Bissell & Liddell LLP

(57) ABSTRACT

A hydraulic control apparatus for a single action cylinder includes a switch valve for supplying fluid to and draining fluid from the cylinder, a cylinder side passage connected to the cylinder, a switch valve side passage connected to the switch valve, and a valve body accommodation chamber. The valve body accommodation chamber linearly extends between the cylinder side passage and the switch valve side passage. An on-off valve is located in a vicinity of a first end of the valve body accommodation chamber. The on-off valve defines a first back pressure chamber. A flow control valve is located in a vicinity of a second end that is opposite to the first end. The flow control valve defines a second back pressure chamber. The on-off valve and the flow control valve are separated from each other by a partitioning member.

9 Claims, 12 Drawing Sheets

HYDRAULIC CONTROL APPARATUS

BACKGROUND OF THE INVENTION

The present invention relates to a hydraulic control apparatus that has a switch valve for controlling supply and drainage of fluid to and from a cylinder, in which the switch valve is switched among a supply position, at which the switch valve supplies fluid from a pump to the cylinder, a drainable position, at which the switch valve drains fluid from the cylinder to the tank, and a neutral position, at which the switch valve does not supply fluid to or drain fluid from the cylinder.

As a hydraulic control apparatus having a switch valve for controlling supply and drainage of fluid to and from a cylinder, a hydraulic control apparatus used in, for example, a forklift is known. Specifically, such an apparatus is used for actuating a lift cylinder for lifting and lowering the fork. The switch valve is switched among a supply position, a drainage position, and a neutral position.

Japanese Laid-Open Patent Publication No. 2006-132680 discloses a hydraulic control apparatus that has an adjusting valve located between a passage connected to a cylinder (cylinder side passage) and a passage connected to a switch valve (switch valve side passage). The regulating valve has a valve body and a fluid chamber. A back pressure chamber of the valve body is exposed to a pilot pressure, so that the valve body contacts a valve seat to shut off a main passage. Further, with the main passage held open, the regulating valve functions as a flow regulator that is capable of controlling the flow rate of fluid by means of flow restricting effect of a space between the edge of the valve body and the fluid chamber. Having the function of an operated check valve and the function of a flow regulator, the regulating valve allows the size of the hydraulic control apparatus to be reduced.

However, in the hydraulic control apparatus according to the above publication, when the regulating valve is forcibly returned to the shutting off position after draining fluid while adjusting the flow rate using the restrictor of the regulating valve, the drainage flow rate is shifted from the restricted state to the shut off state after temporarily being maximized. This can momentarily destabilize the operation of the cylinder.

SUMMARY OF THE INVENTION

Accordingly, it is an objective of the present invention to provide a hydraulic control apparatus that has the function of an operated check valve and the function of a flow regulator, and stably performs shutting off operation without increasing the size.

To achieve the foregoing objective and in accordance with one aspect of the present invention, a hydraulic control apparatus for a single-action cylinder is provided. The hydraulic control apparatus includes a switch valve, a cylinder side passage, a switch valve side passage, a valve body accommodation chamber, an on-off valve, a flow control valve, a partitioning member, a first controller, and a second controller. The switch valve controls supply and drainage of a fluid with respect to the cylinder. The switch valve is switched among a supply position for supplying the fluid to the cylinder, a drainage position for draining the fluid from the cylinder, and a neutral position for preventing the supply and the drainage of the fluid with respect to the cylinder. The cylinder side passage is connected to the cylinder. The switch valve side passage is connected to the switch valve. The valve body accommodation chamber linearly extends between the cylinder side passage and the switch valve side passage. The accommodation chamber has a first end and a second end. In a portion corresponding to the first end, the accommodation chamber has a cylinder side opening that opens to the cylinder side passage. In a portion corresponding to the second end, the accommodation chamber has a switch valve side opening that opens to the switch valve side passage. The on-off valve is displaceably located in a vicinity of the first end of the valve body accommodation chamber. The on-off valve defines a first back pressure chamber in a vicinity of the first end. The on-off valve is capable of shutting off a communication passage that extends from the cylinder side passage to the switch valve side passage through the valve body accommodation chamber. The flow control valve is displaceably located in a vicinity of the second end of the valve body accommodation chamber. The flow control valve defines a second back pressure chamber in a vicinity of the second end. The flow control valve is capable of shutting off the communication passage in accordance with displacement of the flow control valve. The partitioning member is fixed in the valve body accommodation chamber. The partitioning member partly separates the on-off valve and the flow control valve from each other. The partitioning member defines a third back pressure chamber, which is a back pressure chamber for the flow control valve. The first controller controls operation of the on-off valve. When the switch valve is at the neutral position or the supply position, the first controller causes a fluid pressure of the cylinder side passage to act on the first back pressure chamber, thereby urging the on-off valve in a direction for shutting off the communication passage. When the switch valve is at the drainage position, the first controller causes a first pilot pressure, which is lower than the fluid pressure of the cylinder side passage, to the first back pressure chamber. The second controller controls operation of the flow control valve. When the switch valve is at the drainage position, the second controller causes a second pilot pressure, which is lower than the fluid pressure of the cylinder side passage, to act on the second back pressure chamber.

Other aspects and advantages of the present invention will become apparent from the following description, taken into conjunction with the accompanying illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

Figure 1:
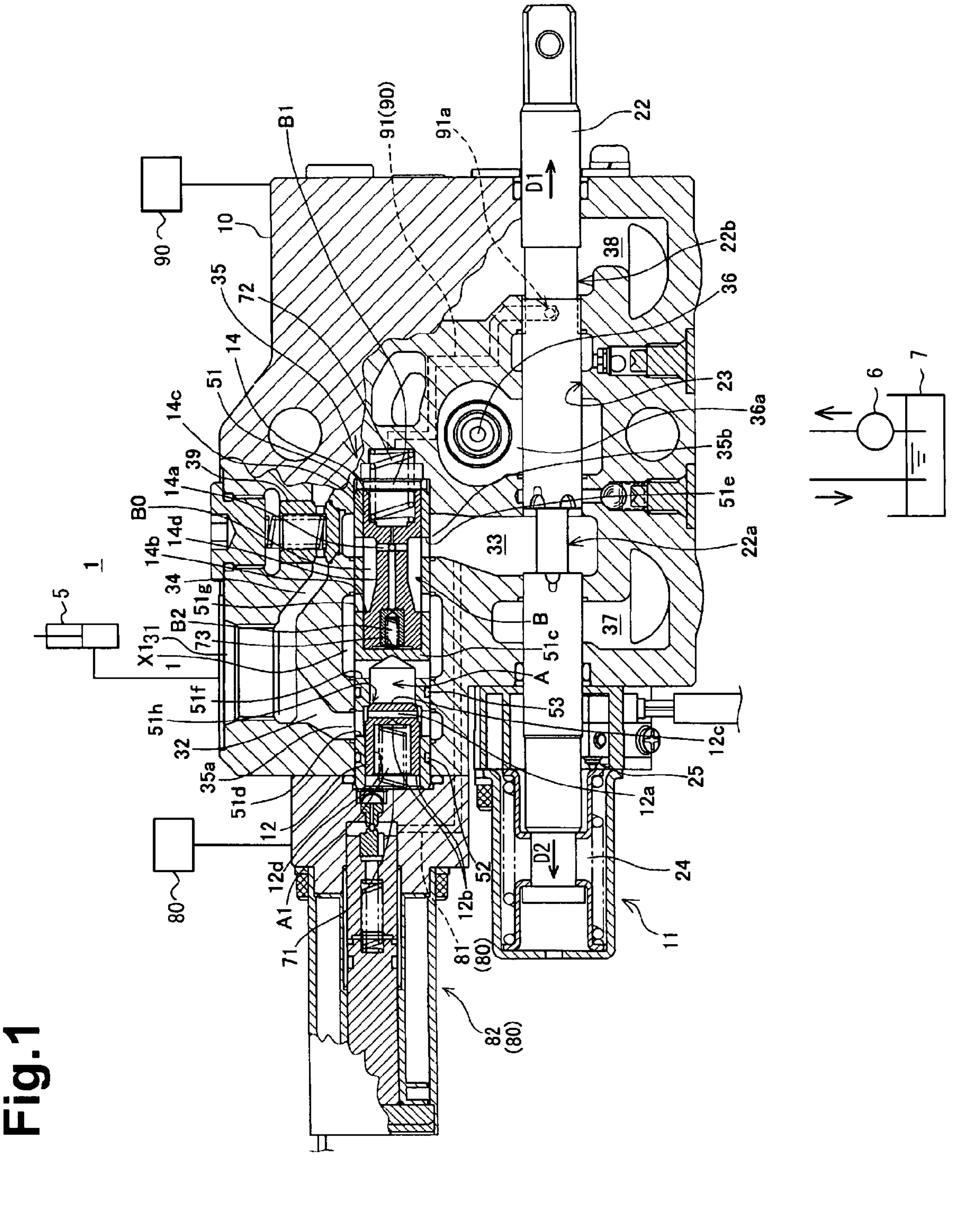
FIG. 1 is a cross-sectional view showing a hydraulic control apparatus according to one embodiment of the present invention.

Embodiments of the present invention will now be described with reference to the drawings. A hydraulic control apparatus 1 according to the present embodiment has a switch valve 11 that controls supply and drainage of fluid to and from a single action cylinder 5. The switch valve 11 is switched among a supply position, at which the switch valve 11 supplies fluid from a pump 6 to the single action cylinder 5, a drainable position, at which the switch valve 11 drains fluid from the single action cylinder 5 to a tank 7, and a neutral position, at which the switch valve 11 does not supply fluid to or drain fluid from the single action cylinder 5. Hereinafter, the hydraulic control apparatus 1, which is used for a lift cylinder (single action cylinder) 5 for lifting and lowering a fork of a forklift, will be described as an example.

FIG. 1 is a cross-sectional view illustrating the hydraulic control apparatus 1 according to the present embodiment. The hydraulic control apparatus 1 forms a part of a lift cylinder control circuit, which is a hydraulic circuit including the lift cylinder 5 for lifting and lowering the fork of the forklift. The forklift has hydraulic circuits (not shown) such as tilt cylinder control circuit and a hydraulic circuit for a power steering system as well as the hydraulic pump 6. Hydraulic oil (fluid) supplied from the hydraulic pump 6 is supplied to the respective circuits including the lift cylinder control circuit. The hydraulic oil supplied to the circuit is recovered to the tank 7 mounted on the forklift. The recovered hydraulic oil is again pressurized by the hydraulic pump 6 and sent to the circuits.

As shown in FIG. 1, the hydraulic control apparatus 1 includes a valve housing 10, the switch valve 11, an on-off valve 12, a valve controller 80, a flow control valve 14, a flow control valve controller 90. The valve housing 10 has various types of ports and passages, and incorporates the switch valve 11, the on-off valve 12, the valve controller 80, the flow control valve 14, and the flow control valve controller 90.

A cylinder port 31 formed in the valve housing 10 is connected to the lift cylinder, which is a single action cylinder, and functions as a supply/drainage port for supplying hydraulic oil to and draining hydraulic from the lift cylinder 5. The valve housing 10 has a supply passage 36, which communicates with the hydraulic pump 6 and receives supply of hydraulic oil from the hydraulic pump 6, a first tank passage 37, and a second tank passage 38. The tank passages 37, 38 communicate with the tank 7, respectively. Further, the valve housing 10 has a passage connected to the cylinder 5 (cylinder side passage 32), a passage connected to the switch valve 11 (switch valve side passage 33), and a first connection passage 34. The cylinder side passage 32 is continuously formed with the cylinder port 31 so as to communicate with the lift cylinder 5. The switch valve side passage 33 communicates with the switch valve 11.

A valve body accommodation chamber 35 is defined between the cylinder side passage 32 and the switch valve side passage 33. The valve body accommodation chamber 35 has a cylinder communicating opening **35*a* opened to the cylinder side passage 32 and a switch valve side opening 35*b* opened to the switch valve side passage 33. The valve body accommodation chamber 35 is a linearly elongated hole that connects the cylinder side passage 32 to the switch valve side passage 33**.

The first connection passage 34 is defined in such a manner as to permit communication between the cylinder side passage 32 and the switch valve side passage 33. The first connection passage 34 is defined separately from a hydraulic oil path including a communication passage X between the cylinder communicating opening **35*a* and the switch valve side opening 35*b*, and serves as a path connecting the cylinder side passage 32 to the switch valve side passage 33. A check valve 39 is provided between the first connection passage 34 and the switch valve side passage 33. The check valve 39 allows hydraulic oil to flow from the connection passage 34 to the switch valve side passage 33, and shuts off flow of hydraulic oil from the switch valve side passage 33 to the first connection passage 34**.

A cylindrical sleeve 51 (defining member) is inserted into the valve body accommodation chamber 35 along the inner wall of the accommodation chamber 35. One end of the sleeve 51 in the axial direction the cylinder (lateral direction as viewed in the drawings) contacts an inner wall surface (bottom of a hole forming the valve body accommodating chamber 35) that is located closer to the switch valve side opening **35*b*, and the other end is supported by a block having an electromagnetic switch valve 82, which will be described below. Seal rings 52, 53 are located at predetermined positions between the inner wall of the valve body accommodation chamber 35 and the outer circumferential surface of the sleeve 51. The seal rings 52, 53 tightly seals between the inner wall of the valve body accommodation chamber 35** and the sleeve outer circumferential wall.

The interior of the sleeve 51 is divided by a partition wall portion (a partition wall) **51*c* in to an on-off valve fluid chamber A, which functions as a first fluid chamber, for accommodating the on-off valve 12 and a flow control valve fluid chamber B, which functions as a second fluid chamber, for accommodating the flow control valve 14. The on-off valve 12 and the flow control valve 14 can be displaced along the axial direction on the inner wall of the sleeve 51** in the on-off valve fluid chamber A and the flow control valve fluid chamber B.

The sleeve 51 has a cylinder side through hole **51*d* connecting the fluid chamber A to the cylinder side passage 32 and a switch valve side through hole 51*e* connecting the fluid chamber B to the switch valve side passage 33. The sleeve 51 has a first through hole 51*f* and a second through hole 51*g*. The first through hole 51*f* opens to the fluid chamber A at a location closer to the partition wall portion 51*c* than the cylinder side through hole 51*d*. The second through hole 51*g* opens to the fluid chamber B at a location closer to the partition wall portion 51*c* than the switch valve side through hole 51*e***.

A groove is formed in the inner wall of the valve body accommodation chamber 35. The groove extends along the axis of the sleeve 51 from a position that faces the first through hole **51*f* to a position that faces the second through hole 51*g*. Accordingly, a clearance (sleeve outer circumference passage) is defined between the outer wall surface of the sleeve 51 and the inner surface of the valve body accommodation chamber 35. That is, a second connection passage X1 for connecting the fluid chamber A and the fluid chamber B to each other is formed in the inner wall of the valve body accommodation chamber 35. In this manner, the communication passage X extending from the cylinder side passage 32 to the switch valve side passage 33 forms a passage including the cylinder side passage 32, the cylinder side through hole 51***d*, the fluid chamber A, the second connection passage X1, the flow control valve fluid chamber B, the switch valve side through hole 51*e*, and the switch valve side passage 33.

The on-off valve 12 has a columnar shape, and has a hole 12*d* at one end. The hole 12*d* holds a spring 71, which will be discussed below. The hole 12*d* defines a space that functions as a back pressure chamber. The on-off valve 12 can be displaced on the axis of the sleeve 51 along the inner wall of the sleeve 51 in the vicinity of an end of the valve body accommodation chamber 35 close to the cylinder communicating opening 35*a*.

The on-off valve 12 is arranged such that the sliding surface is located closer to the electromagnetic switch valve 82 than the cylinder side through hole 51*d*. The on-off valve 12 defines the fluid chamber A. In the on-off valve 12, a first back pressure chamber A1 is located closer to the electromagnetic switch valve 82 than the cylinder side through hole 51*d*.

A spring 71 is located in the first back pressure chamber A1. The spring 71 urges the on-off valve 12 toward the partition wall portion 51*c*. The on-off valve 12 can be displaced toward the partition wall portion 51*c* to a position at which an end face 12*c* of the on-off valve 12 contacts a step-like valve seat 51*h* formed on the inner wall of the sleeve 51. When the end face 12*c* of the on-off valve 12 contacts the valve seat 51*h*, the communication passage X, which allows hydraulic oil to flow from the cylinder side passage 32 to the switch valve side passage 33 via the valve body accommodation chamber 35, is shut off.

The first back pressure chamber A1 and the cylinder side passage 32 are connectable to each other by a pressure introduction line 12*a* formed in the on-off valve 12. The pressure introduction line 12*a* allows the first back pressure chamber A1 to be exposed to the pressure of fluid in the cylinder side passage 32. The pressure of oil (hydraulic pressure) in the first back pressure chamber A1 is controlled by the valve controller 80, which will be discussed below.

An urging force is generated at an end face 12*b* of the on-off valve 12 that faces the first back pressure chamber A1 due to the force of the spring 71 and the hydraulic pressure acting on the first back pressure chamber A1. Another urging force is generated due to hydraulic pressure acting on the end face 12*c* of the on-off valve 12 that faces the partition wall portion 51*c*. The on-off valve 12, which is constructed as described above, operates based on these urging forces. Therefore, the on-off valve 12 keeps contacting the valve seat 51*h* if the urging force due to the spring 71 and the hydraulic pressure of the first back pressure chamber A1 is greater than the urging force due to the hydraulic pressure acting on the end face 12*c* of the on-off valve 12. On the other hand, the on-off valve 12 is moved to an open state if the urging force due to the hydraulic pressure acting on the end face 12*c* is greater than the urging force due to the spring 71 and the hydraulic pressure of the first back pressure chamber A1.

The flow control valve 14 is arranged such that its longitudinal direction agrees with the axial direction of the sleeve 51. Large diameter portions 14*b*, 14*c* are formed at longitudinal ends of the flow control valve 14, respectively. A small diameter portion 14*d* having a diameter less than those of end portions is formed in a longitudinal center portion of the flow control valve 14. A hollow portion is formed in each of the large diameter portion 14*b* and the large diameter portion 14*c*, which are ends of the flow control valve 14. The hollow portion of the large diameter portion 14*b* holds a spring 73 and serves as a back pressure chamber. The hollow portion of the large diameter portion 14*c* holds a spring 72 and serves as a back pressure chamber.

The flow control valve 14 can be displaced in the vicinity of an end located close to the switch valve side opening 35*b* in the valve body accommodation chamber 35. Specifically, the flow control valve 14 can be displaced along the cylindrical axis of the sleeve 51 with the outer circumference of the large diameter portions 14*b*, 14*c* sliding on the inner surface of the sleeve 51 in the fluid chamber B. That is, while the large diameter portions 14*b*, 14*c* slide on the inner wall of the sleeve 51, a clearance B0 is defined between the sleeve 51 and then flow control valve at the small diameter portion 14*d* in the center portion.

A second back pressure chamber B1 is defined in the valve body accommodation chamber 35 at a position in the vicinity of an end located close to the switch valve side opening 35*b*. A spring 72 is located in the second back pressure chamber B1. The spring 72 urges the flow control valve 14 toward the partition wall portion 51*c*.

The flow control valve 14 has a pressure introduction line 14*a* that extends along the longitudinal direction and opens to the clearance B0. The second back pressure chamber B1 and the clearance B0, which is located close to the small diameter portion 14*d*, are connectable to each other by the pressure introduction line 14*a*. The second back pressure chamber B1 is exposed to the pressure of fluid in the switch valve side passage 33 through the clearance B0. The pressure of oil (hydraulic pressure) in the second back pressure chamber B1 is controlled by the flow control valve controller 90, which will be discussed below.

A third back pressure chamber B2 of the flow control valve 14 is defined between the flow control valve 14 and the partition wall portion 51*c*. A spring 73 is located in the third back pressure chamber B2. The spring 73 urges the flow control valve 14 away from the fluid chamber A. The spring 73 preferably has an elastic modulus smaller than that of the spring 72. The third back pressure chamber B2 and the clearance B0, which is located close to the small diameter portion, are connectable to each other by the pressure introduction line 14*a*. The second back pressure chamber B2 is exposed to the pressure of fluid in the switch valve side passage 33 through the clearance B0.

When the end of the flow control valve 14 located close to the partition wall portion 51*c* contacts the partition wall portion 51*c*, the second through hole 51*g* faces the small diameter portion 14*d* of the flow control valve 14. Thus, the large diameter portion 14*b* does not hinder the flow of hydraulic oil into the fluid chamber B through the second through hole 51*g*.

When the end of the flow control valve 14 is displaced from the state contacting the partition wall portion 51*c* away from the fluid chamber A, the large diameter portion 14*b* is displaced to shut off the opening of the second through hole 51*g*. Accordingly, the flow of hydraulic oil flowing into the fluid chamber B through the second through hole 51*g* is reduced. That is, in accordance with the amount of displacement of the flow control valve 14, the opening degree (denoted as a in FIGS. 11 and 12) of the communication passage X, which allows hydraulic oil to flow from the cylinder side passage 32 to the switch valve side passage 33 through the valve body accommodation chamber 35, is changed.

In a state where the on-off valve 12 opens the communication passage X, the flow control valve 14, which is constructed as described above, receives, along a direction to increase the opening degree of the communication passage X, that is, a direction toward the partition wall portion 51*c*, the urging force of the spring 72 acting on the end face of the flow control valve 14 and the urging force due to the hydraulic pressure acting on the end face of the flow control valve 14 in the second back pressure chamber B1. The flow control valve 14 also receives, along a direction to reduce the opening degree of the communication passage X, that is, a direction away from the partition wall portion 51*c*, the urging force of the spring 73 acting on the end face of the flow control valve 14 and the urging force due to the hydraulic pressure acting on the end face of the flow control valve 14 in the third back pressure chamber B2.

The flow control valve 14 is maintained at a position where these urging forces are in equilibrium. In a state where the on-off valve 12 opens the communication passage X, if the hydraulic pressure acting on the clearance B0 through the second through hole 51*g* is raised, the fluid pressure is conducted to the third back pressure chamber B2 via the pressure introduction line 14*a*. Therefore, the urging force that acts to displace the flow control valve 14 away from the on-off valve 12 is increased. Accordingly, the spring 72 contracts, so that the flow control valve 14 is displaced until the force urging the end of the flow control valve in the second back pressure chamber B1 is in equilibrium with the above described urging force. As a result, the passage between the second through hole 51*g* and the large diameter portion 14*b* is reduced, so that the opening degree of the communication passage X is reduced. Accordingly, the flow rate is automatically adjusted. In this manner, the flow control valve 14 is displaced in accordance with the hydraulic pressure of the switch valve side passage 33.

Figure 5:
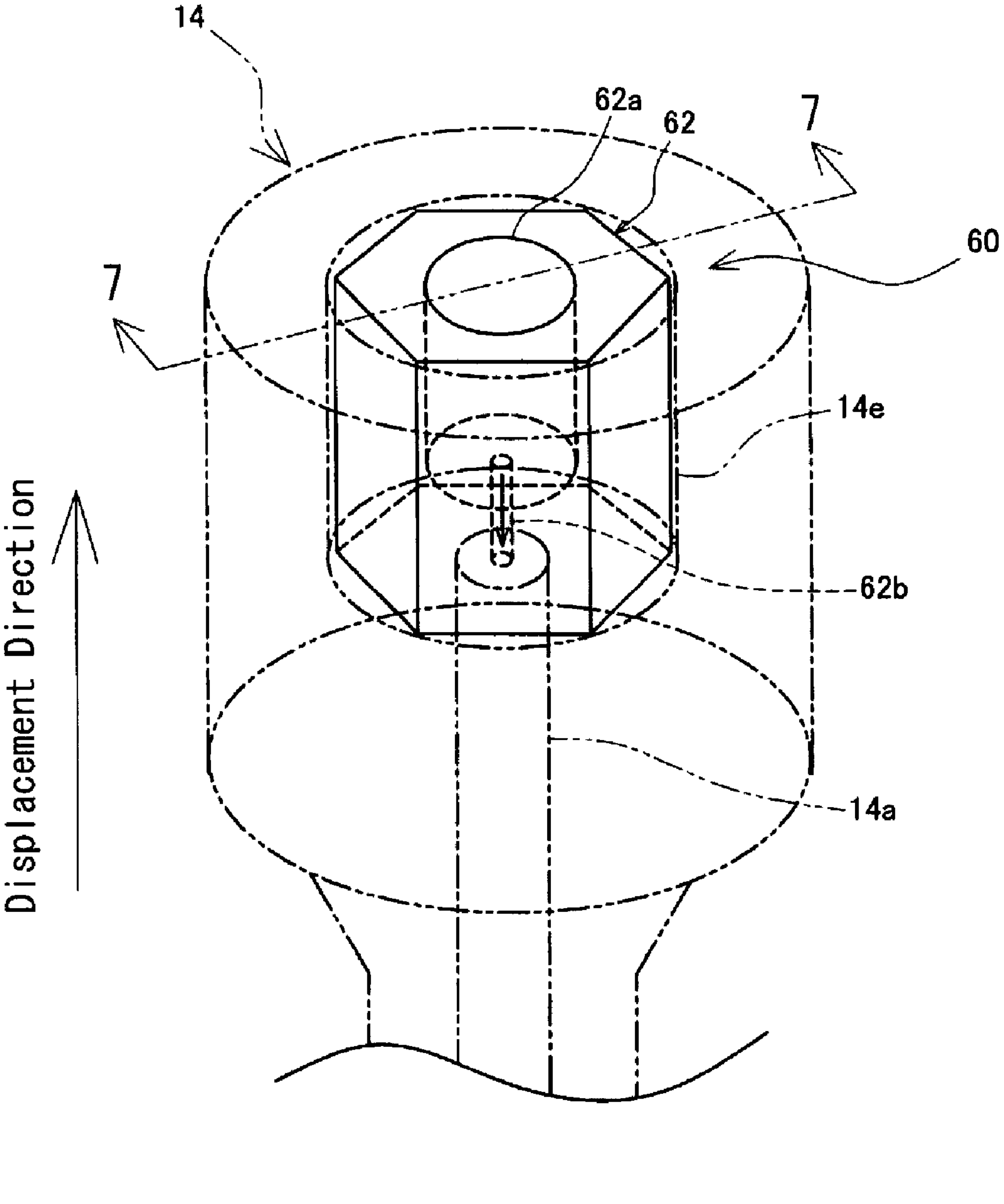
FIG. 5 is an enlarged diagrammatic view showing an end portion of a flow control valve that faces a third back pressure chamber of the hydraulic control apparatus shown in FIG. 1.
Figure 6:
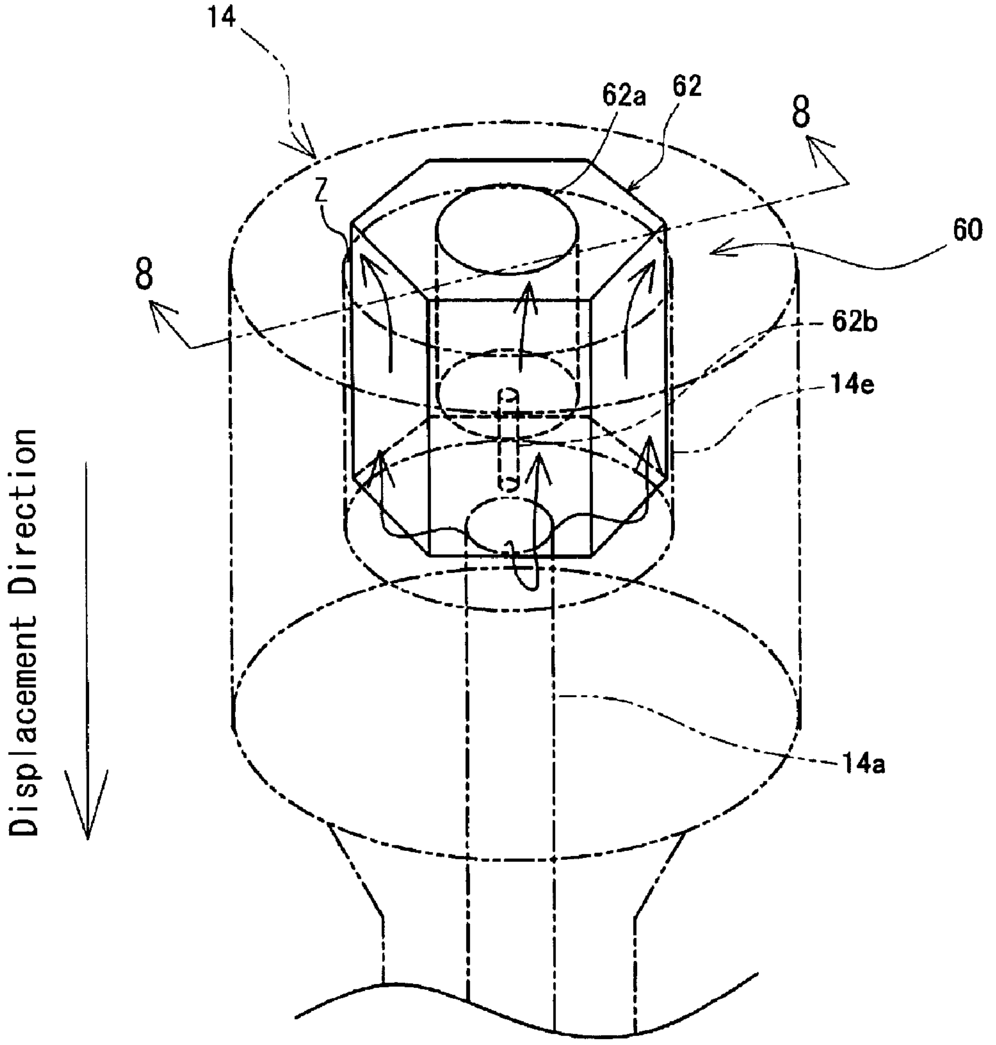
FIG. 6 is an enlarged diagrammatic view showing the end portion of the flow control valve that faces the third back pressure chamber of the hydraulic control apparatus shown in FIG. 1.
Figure 7:
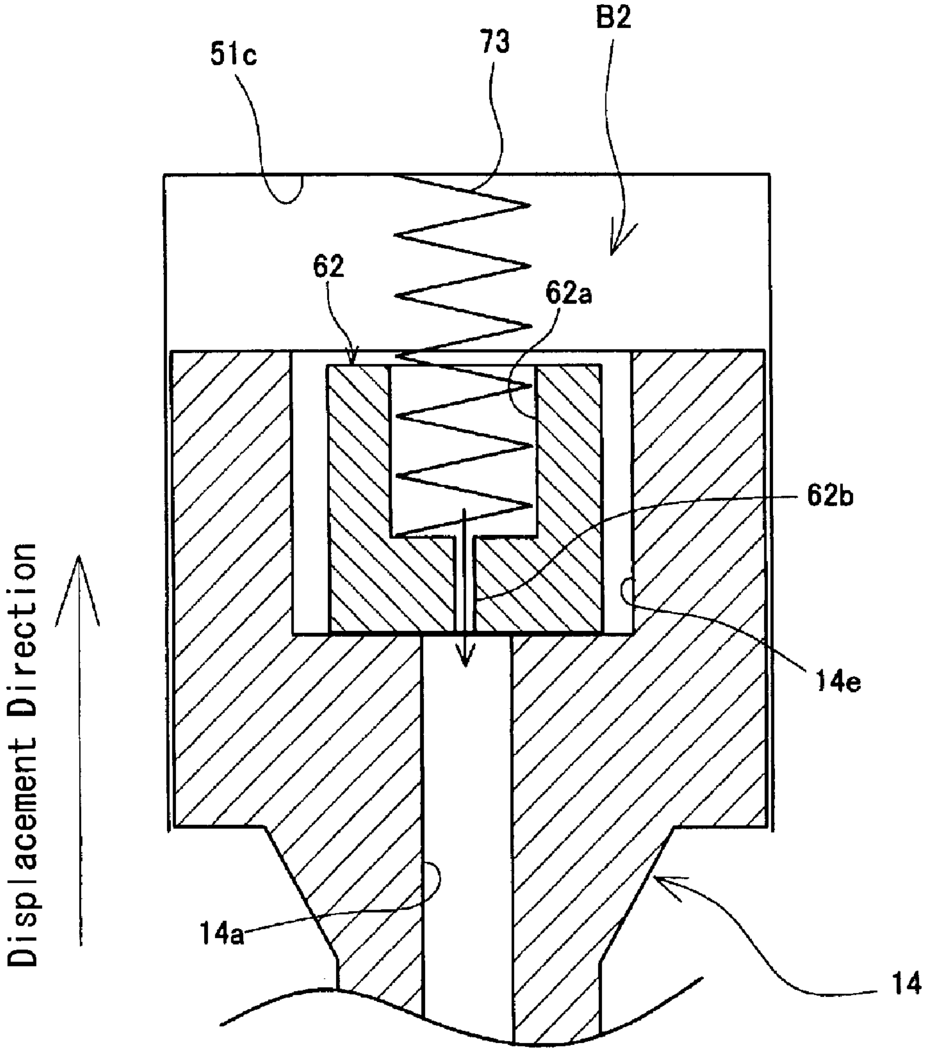
FIG. 7 is a diagrammatic cross-sectional view taken along line 7-7 of FIG. 5.
Figure 8:
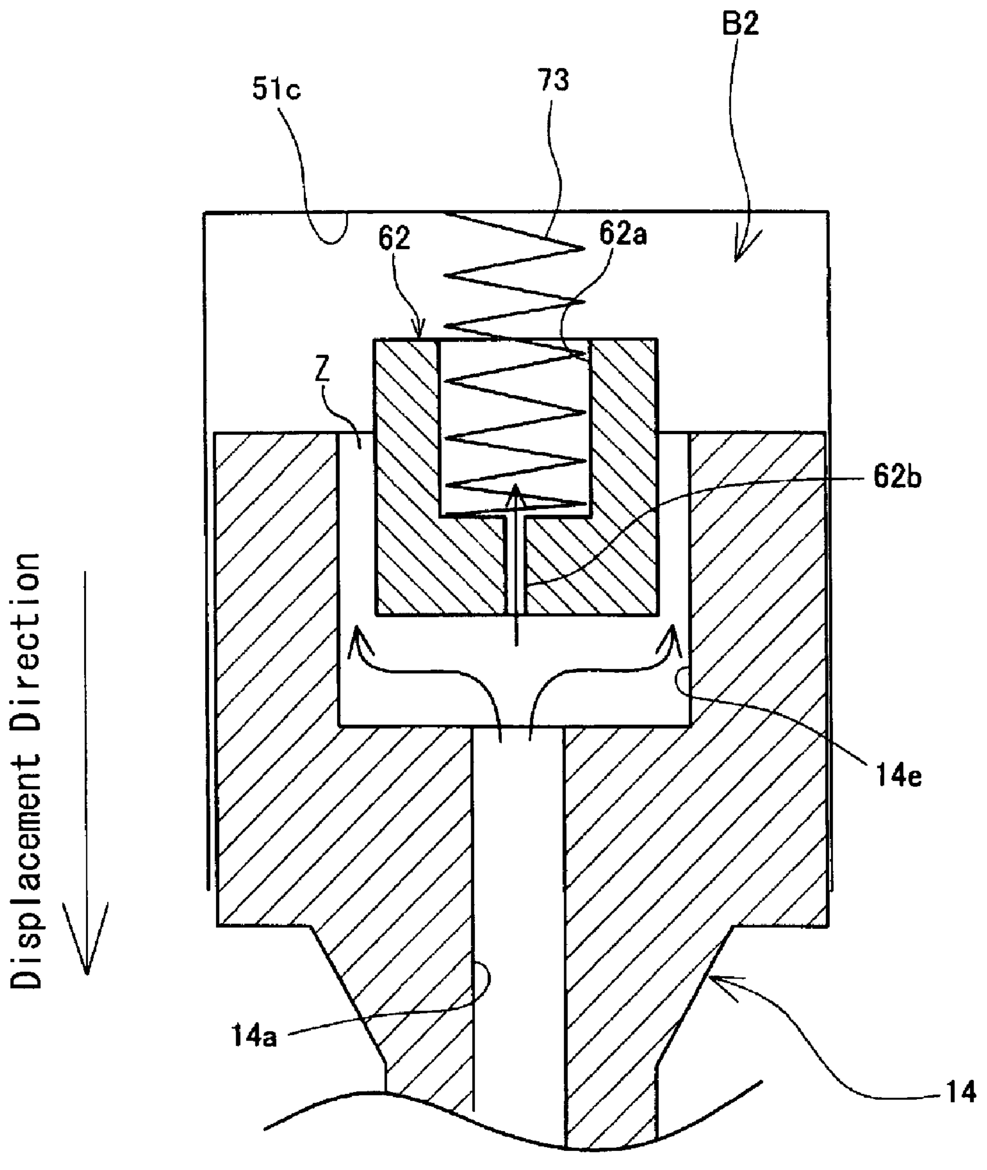
FIG. 8 is a diagrammatic cross-sectional view taken along line 8-8 of FIG. 6.

FIGS. 5 and 6 are enlarged diagrammatic views showing the end portion of the flow control valve 14 that faces the third back pressure chamber B2. FIG. 7 is a diagrammatic cross-sectional view taken along line 7-7 of FIG. 5, and FIG. 8 is a diagrammatic cross-sectional view taken along line 8-8 of FIG. 6.

As shown in FIGS. 5 and 6, a damper mechanism 60 is provided in an end of the flow control valve 14 that faces the third back pressure chamber B2. The damper mechanism 60 has a sliding portion 62 shaped as a hexagonal column and an accommodation hole 14*e* formed in the flow control valve 14. The accommodation hole 14*e* is a columnar hole continuous to the pressure introduction line 14*a*, and accommodates the sliding portion 62 such that the sliding portion 62 is slidable along axial direction of the accommodation hole 14*e*.

The sliding portion 62 has a large diameter hole 62*a* formed from one end to the other end, and a small diameter hole 62*b* that is continuous to the large diameter hole 62*a* and is opened at the other end. The diameter of the small diameter hole 62*b* is smaller than the diameter of the large diameter hole 62*a*. The small diameter hole 62*b* reduces the flow of fluid through the large diameter hole 62*a*. The sliding portion 62 is arranged such that an end at which the small diameter hole 62*b* is opened selectively contacts a bottom of the accommodation hole 14*e* of the flow control valve 14.

In a contacting state, where the end in which the small diameter hole 62*b* opens contacts the bottom of the accommodation hole 14*e* as shown in FIGS. 5 and 7, the sliding portion 62 is in a position in which the small diameter hole 62*b* is continuous with the pressure introduction line 14*a*. In this state, the third back pressure chamber B2 is connected to the pressure introduction line 14*a* only by the small diameter hole 62*b*.

In a non-contacting state, where the end in which the small diameter hole 62*b* opens is separated from the bottom of the accommodation hole 14*e* as shown in FIGS. 6 and 8, fluid flows from the pressure introduction line 14*a* to the third back pressure chamber B2 through the clearance between the outer wall of the sliding portion 62 and the inner circumferential wall of the accommodation hole 14*e*.

In the case where fluid flows from the pressure introduction line 14*a* to the third back pressure chamber B2, the end face of the sliding portion 62 in which the small diameter hole 62*b* is formed is urged by the fluid, so that the sliding portion 62 is displaced in a direction projection from the accommodation hole 14*e*. This opens the passage including the aforementioned clearance. That is, the damper mechanism 60 is shifted to the non-contacting state shown in FIGS. 6 and 8. This allows the flow control valve 14 to be quickly displaced away from the partition wall portion 51*c* (along a direction labeled Displacement Direction in FIGS. 6 and 8).

On the other hand, when fluid flows from the third back pressure chamber B2 to the pressure introduction line 14*a*, the sliding portion 62 is urged by the fluid at the end face on the side of the large diameter hole 62*a* and the bottom of the large diameter hole 62*a*. Accordingly, as shown in FIGS. 5 and 7, the sliding portion 62 is held in a state where the end face on the side of the small diameter hole 62*b* contacts the bottom of the accommodation hole 61. This shuts off the passage through the clearance. Therefore, fluid flows from the third back pressure chamber B2 to the pressure introduction line 14*a* only through the small diameter hole 62*b*.

In this manner, the damper mechanism 60 allows the sliding portion 62 to function as a check valve, thereby shutting off the flow of fluid from the third back pressure chamber B2 to the pressure introduction line 14*a* through the clearance. The damper mechanism 60 has a passage that permits the flow of fluid from the pressure introduction line 14*a* to the third back pressure chamber B2, and the small diameter hole 62*b* (restrictor passage) that connects the third back pressure chamber B2 to the pressure introduction line 14*a*.

It is therefore possible to make the flow resistance of fluid flowing out of the third back pressure chamber B2 to the pressure introduction line 14*a* greater than the flow resistance of fluid flowing into the third back pressure chamber B2 from the pressure introduction line 14*a*. Therefore, compared to the displacement speed of the flow control valve 14 when the flow control valve 14 is displaced in a direction increasing the volume of the third back pressure chamber B2 (along a direction labeled Displacement Direction in FIGS. 6 and 8), the displacement speed of the flow control valve 14 when the flow control valve 14 is displaced in a direction reducing the volume of the third back pressure chamber B2 (along a direction labeled Displacement Direction in FIGS. 5 and 7) is made smaller. As a result, hydraulic pulsation that may be generated through displacement of the flow control valve 14 is attenuated. Also, the impact caused when the end of the flow control valve 14 contacts the partition wall portion 51*c* is reduced.

Figure 9:
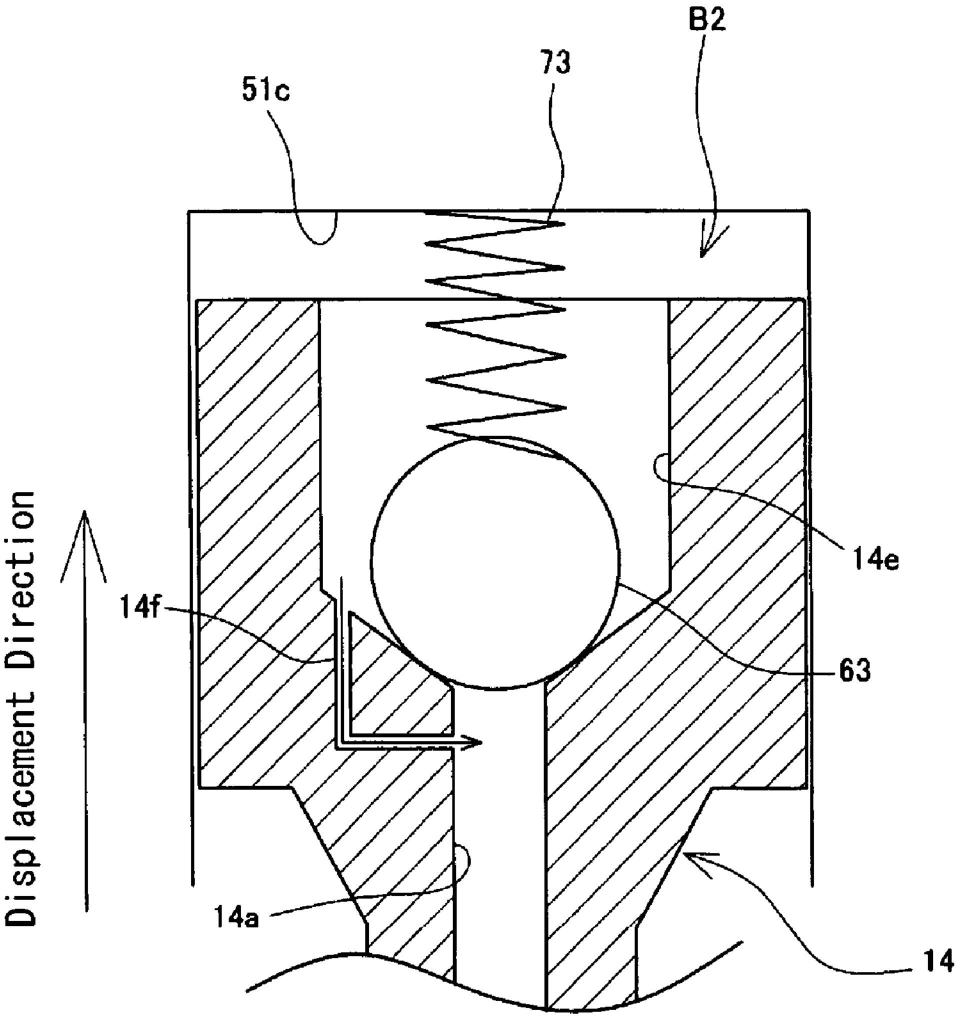
FIG. 9 is a cross-sectional view showing a modification of the damper mechanism shown in FIG. 5.
Figure 10:
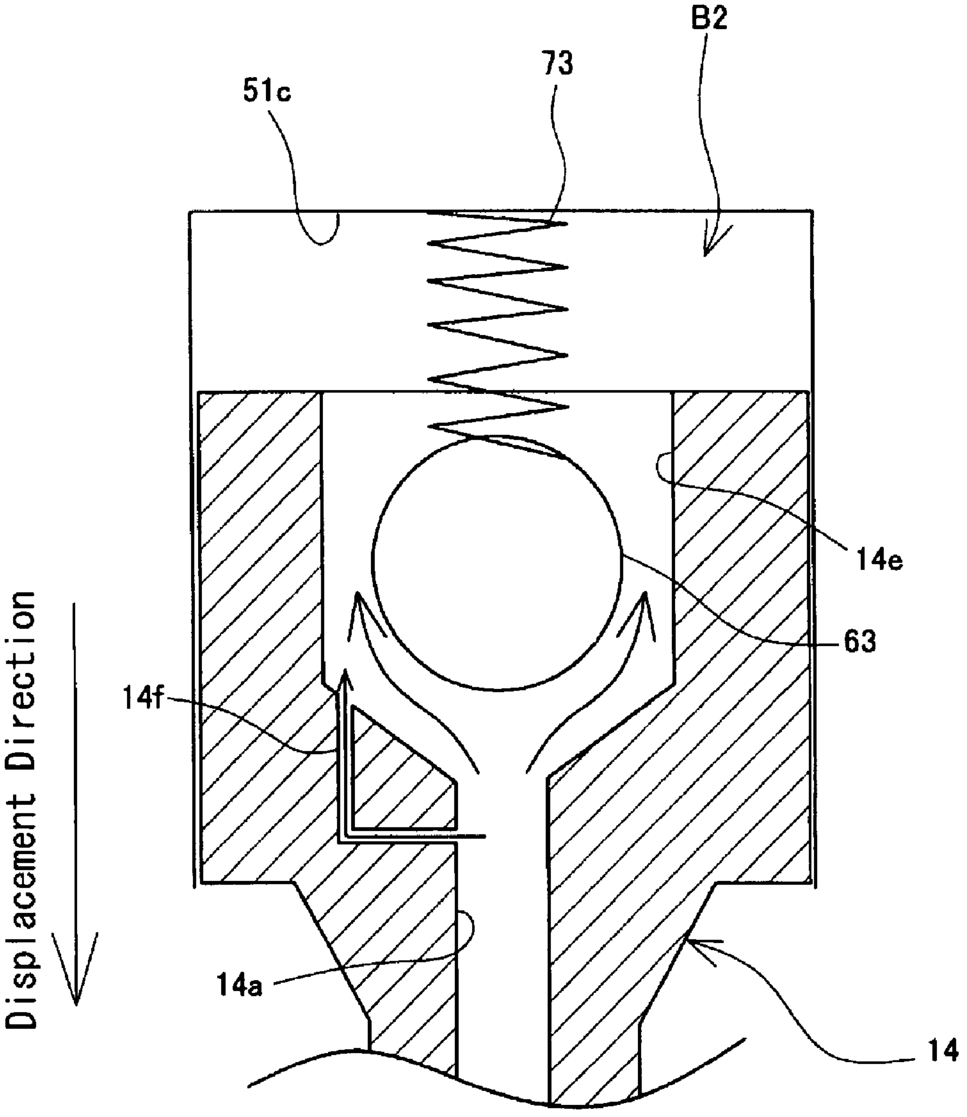
FIG. 10 is a cross-sectional view showing a modification of the damper mechanism shown in FIG. 5.

The configuration of the damper mechanism 60 is not limited to the one illustrated in FIGS. 5 to 8. For example, a check valve shown in FIGS. 9 and 10 may be provided. This check valve has a spherical body 63. The spherical body 63 is urged by the spring 73 so as to contact the opening of the pressure introduction line 14*a*, thereby shutting off the pressure introduction line 14*a*. Also, a restrictor passage 14*f* is formed at a position away from the opening of the pressure introduction line 14*a*. The restrictor passage 14*f* conducts fluid in the third back pressure chamber B2 to the pressure introduction line 14*a*. In this configuration, when the flow control valve 14 is displaced in a direction reducing the volume of the third back pressure chamber B2 as shown in FIG. 9, fluid is conducted from the third back pressure chamber B2 to the pressure introduction line 14*a* only through the restrictor passage 14*f*. Thus, the displacement speed of the flow control valve 14 is lowered. Also, when the flow control valve 14 is displaced in a direction increasing the volume of the third back pressure chamber B2 as shown in FIG. 10, the spherical body 63 is urged and displaced away from the flow control valve 14. This allows fluid to flow into the third back pressure chamber B2 from the pressure introduction line 14*a*. Therefore, the displacement speed of the flow control valve 14 is greater compared to a case in which the flow control valve 14 is moved in a direction reducing the third back pressure chamber.

The switch valve 11 is provided for controlling supply and drainage of hydraulic oil to and from the lift cylinder 5. The switch valve 11 is configured as a spool valve having has a spool 22, a spool hole 23, and a spring chamber 24. The spool 22 is accommodated in the spool hole 23 to be displaced along the axial direction. The spring chamber 24 holds the spool 22 at the neutral position. When a lift lever (not shown) is operated and the spool 22 is displaced in the axial direction, the switch valve 11 (specifically, the spool 22) is switched among the supply position, the neutral position, and the drainage position.

FIG. 1 shows a state in which the switch valve 11 is at the neutral position. In this state, hydraulic oil is not supplied to or drained from the lift cylinder 5. When the spool 22 is displaced in a direction indicated by arrow D1 in FIG. 1 from the neutral position, the switch valve 11 is switched to the supply position. In this state, hydraulic oil is supplied from the hydraulic pump 6 to the lift cylinder 5 as discussed below (see FIG. 2).

On the other hand, when the spool 22 is displaced in a direction indicated by arrow D2 in FIG. 1 from the neutral position shown in FIG. 1, the switch valve 11 is switched to the drainage position. In this state, hydraulic oil is drained from the lift cylinder 5 to the tank 7 (see FIG. 3). The spool 22 has a first land portion 22*a* of a relatively small diameter and a second land portion 22*b* at two positions in the axial direction.

The valve controller 80, which functions as a first controller, controls the operation of the on-off valve 12, and has a first pilot line 81 and an electromagnetic switch valve 82 (first switching portion) as shown in FIG. 1.

The first pilot line 81 is formed in the valve housing 10. When the electromagnetic switch valve 82 is switched in a manner described below, the first pilot line 81 selectively connects the first back pressure chamber A1 of the on-off valve 12 and the switch valve side passage 33. The first pilot line 81 functions as a pilot pressure generating portion that generates a first pilot pressure, which is lower than the hydraulic pressure in the cylinder side passage 32, and applies the first pilot pressure to the first back pressure chamber A1.

The electromagnetic switch valve 82 is an electromagnetic switch valve that connects and shuts off the first back pressure chamber A1 and the first pilot line 81 with respect to each other. A limit switch 25 is attached to the valve housing 10. The electromagnetic switch valve 82 is excited and de-excited by a controller (not shown) that detects the operating state of a limit switch 25 provided in the valve housing 10. When the switch valve 11 is at the neutral position or the supply position, the electromagnetic switch valve 82 disconnects the first back pressure chamber A1 and the first pilot line 81 from each other (see FIGS. 1 and 2). On the other hand, when the switch valve 11 is at the drainage position, the electromagnetic switch valve 82 connects the first back pressure chamber A1 and the first pilot line 81 with each other (see FIGS. 3 and 4). That is, as shown in FIG. 1, the displacement of the spool 22 when the switch valve 11 is switched from the neutral position to the drainage position (displacement indicated by arrow D2 in the drawing) causes the first pilot line 81 to be open. As a result, the first back pressure chamber A1 is connected to the switch valve side passage 33.

In a state where the first back pressure chamber A1 and the first pilot line 81 are disconnected from each other, the hydraulic pressure of the cylinder side passage 32 acts on the first back pressure chamber A1 through the on-off valve 12 and the pressure introduction line 12*a*. On the other hand, in a state where the first back pressure chamber A1 and the first pilot line 81 are connected to each other, the first pilot pressure, which is lower than the hydraulic pressure of the cylinder side passage 32, acts on the first back pressure chamber A1 through the first pilot line 81. In this manner, when the switch valve 11 is at the neutral position or the supply position, the electromagnetic switch valve 82, which functions as a switching portion, causes the hydraulic pressure of the cylinder side passage 32 to act on the first back pressure chamber A1. When the switch valve 11 is at the drainage position, the electromagnetic switch valve 82 causes the first pilot pressure to act on the first back pressure chamber A1.

The valve controller 80 includes the first pilot line 81 and the electromagnetic switch valve 82, which are described above. When the switch valve 11 is at the neutral position or the supply position, the valve controller 80 causes the hydraulic pressure of the cylinder side passage 32 to act on the first back pressure chamber A1 so that the communication passage X between the cylinder side passage 32 and the switch valve side passage 33 is shut off. That is, the on-off valve 12 is urged toward the valve seat 51*h*. On the other hand, when the switch valve 11 is at the drainage position, the valve controller 80 causes the on-off valve 12 to separate from the valve seat 51*h* so that the first pilot pressure, which is lower than the hydraulic pressure of the cylinder side passage 32, acts on the first back pressure chamber A1.

The flow control valve controller 90, which functions as a second controller, controls the operation of the flow control valve 14, and has a second pilot line 91 as shown in FIG. 1.

The second pilot line 91 is formed in the valve housing 10. As the spool 22 is displaced in the axial direction, the second pilot line 91 connects the second back pressure chamber B1 and the tank 7 to each other. The second pilot line 91 supplies a second pilot pressure, which is lower than the hydraulic pressure of the cylinder side passage 32, to the second back pressure chamber B1.

The second pilot line 91 communicates with the second tank passage 38 only when an opening 91*a* of the spool hole 23 located in the second pilot line 91 faces the second land portion 22*b*. The opening degree of a restrictor provided at the opening 91*a* of the second pilot line 91 is adjusted as the spool 22 is displaced in a direction of arrow D2 in the drawings.

Figure 2:
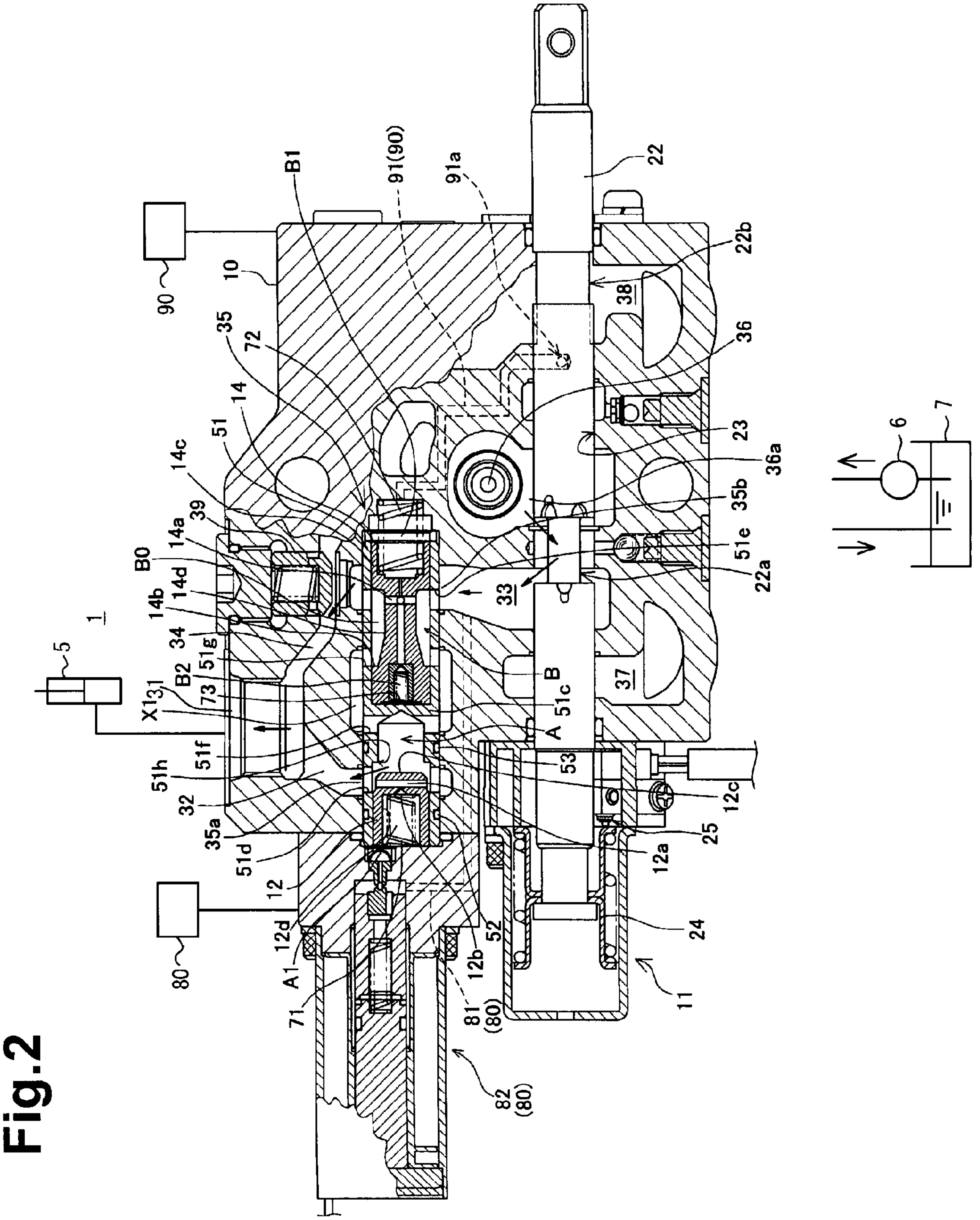
FIG. 2 is a cross-sectional view explaining the operation of the hydraulic control apparatus of FIG. 1.
Figure 3:
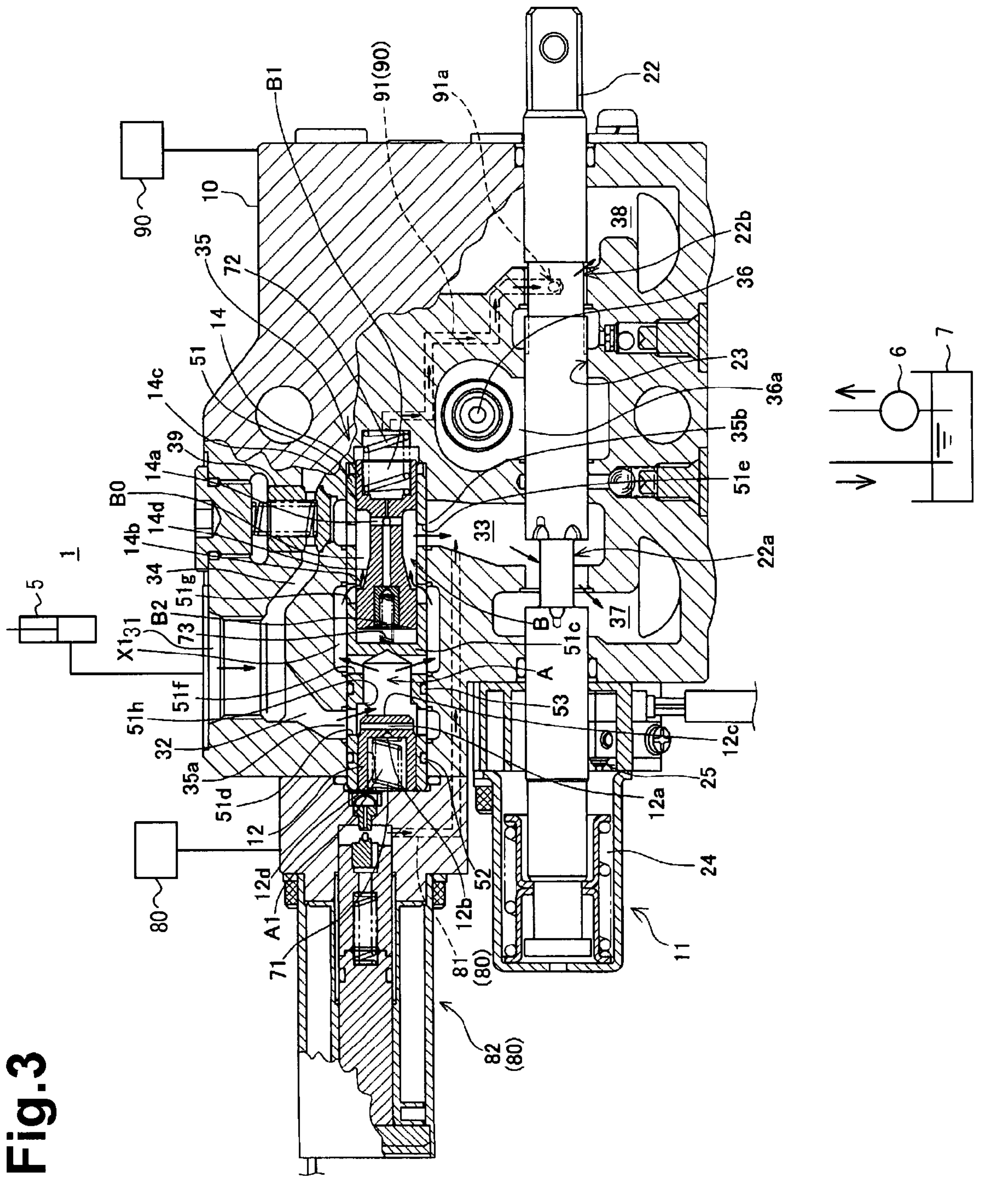
FIG. 3 is a cross-sectional view explaining the operation of the hydraulic control apparatus of FIG. 1.
Figure 4:
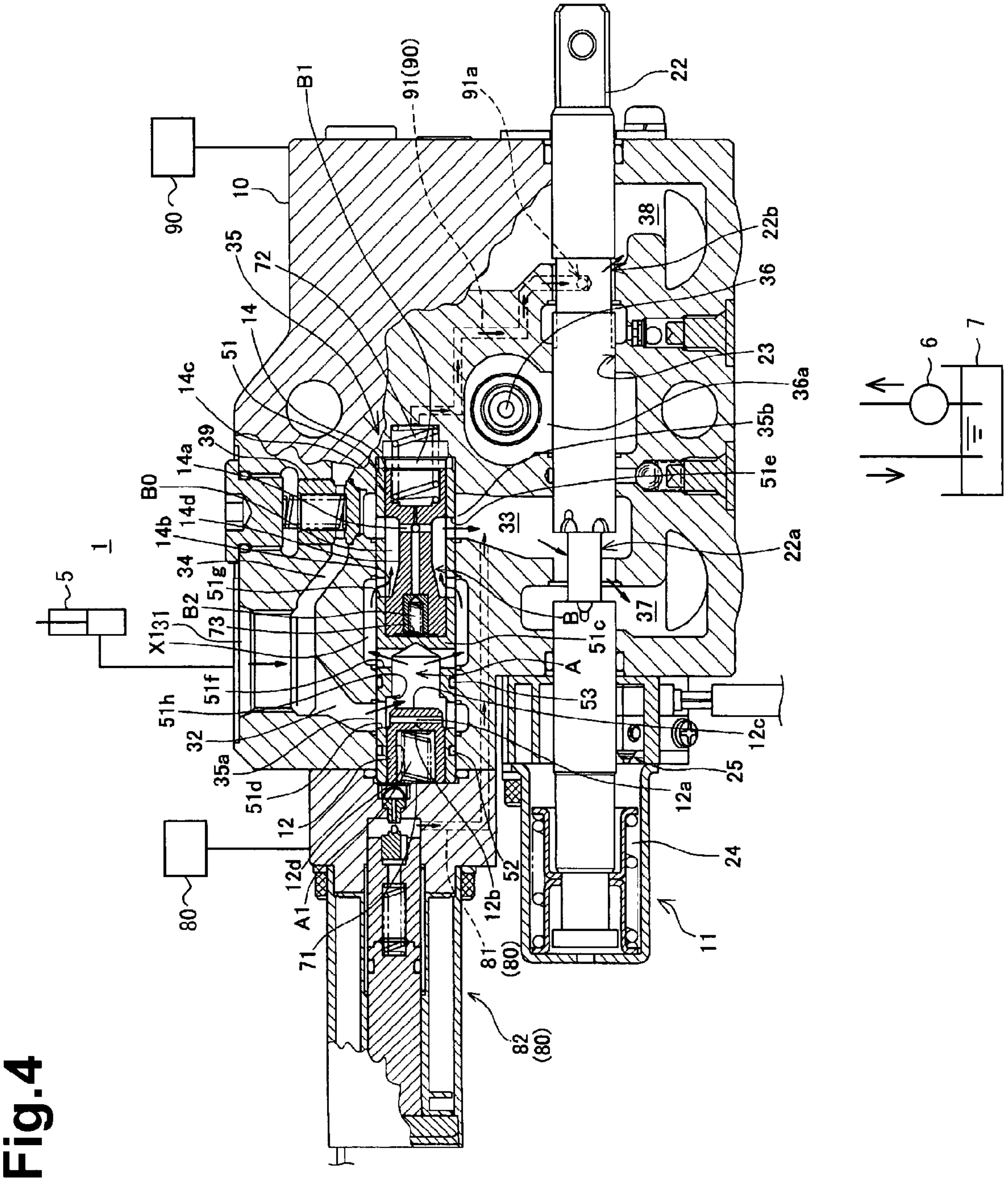
FIG. 4 is a cross-sectional view explaining the operation of the hydraulic control apparatus of FIG. 1.

When the switch valve 11 is at the neutral position or the supply position, the restrictor at the opening 91*a* of the second pilot line 91 is closed. This disconnects the second tank passage 38 and the second pilot line 91 from each other (see FIGS. 1 and 2). On the other hand, when the switch valve 11 is at the drainage position, the opening 91*a* of the second pilot line 91 faces the second land portion 22*b*, so that the second tank passage 38 and the first pilot line 81 are connected to each other (FIGS. 3 and 4). That is, as shown in FIG. 1, the displacement of the spool 22 when the switch valve 11 is switched from the neutral position to the drainage position (displacement indicated by arrow D2 in the drawing) causes the second pilot line 91 to be open, so that the second back pressure chamber B1 and the second tank passage 38 are connected to each other.

In a state where the second pilot line 91 and the second tank passage 38 are disconnected from each other, the hydraulic pressure of the clearance B0, which is conducted through the pressure introduction line 14*a* of the flow control valve 14 acts on the second back pressure chamber B1. On the other hand, in a state where the second pilot line 91 and the second tank passage 38 are connected to each other, the hydraulic pressure of the second tank passage 38, or the second pilot pressure, which is lower than the hydraulic pressure of the cylinder side passage 32, acts on the second back pressure chamber B1.

The flow control valve controller 90 has the second pilot line 91, which changes the opening degree of the restrictor at the opening 91*a* as the spool 22 is displaced in the axial direction. Thus, when the switch valve 11 is at the neutral position or the supply position, the hydraulic pressure of the switch valve side passage 33 acts on the second back pressure chamber B1. On the other hand, when the switch valve 11 is at the drainage position, the second pilot pressure, which is lower than the hydraulic pressure of the cylinder side passage 32, acts on the second back pressure chamber B1.

The operation of the hydraulic control apparatus 1 as constructed above will now be described.

When the switch valve 11 is at the neutral position as shown in FIG. 1, the spool 22 is at a position to disconnect the supply passage 36 and the switch valve side passage 33 from each other, and to disconnect the first tank passage 37 and the switch valve side passage 33 from each other. In this state, neither the supply of hydraulic oil to the switch valve side passage 33 nor the drainage of hydraulic oil from the switch valve side passage 33 is performed. At this time, since the electromagnetic switch valve 82 disconnects the first back pressure chamber A1 of the on-off valve 12 and the first pilot line 81 from each other, the hydraulic pressure of the cylinder side passage 32 acts on the first back pressure chamber A1 through the pressure introduction line 12*a*. Since a first urging force, which is generated by the hydraulic pressure of the cylinder side passage 32 and the spring 71, is greater than a second urging force of the hydraulic pressure acting from the partition wall portion 51*c* to the end portion 12*c*, the end portion 12*c* of the on-off valve 12 contacts the valve seat 51*h*. That is, the on-off valve 12 is maintained in the closed state.

When the switch valve 11 is at the neutral position, the opening degree of the restrictor at the opening 91*a* of the second pilot line 91 is closed. Thus, the second back pressure chamber B1 and the third back pressure chamber B2 of the flow control valve 14 are exposed to the hydraulic pressure of the clearance B0 and the switch valve side passage 33. The urging force of the spring 72, which urges the flow control valve 14 in the second back pressure chamber BE, is greater than the urging force of the spring 73, which urges the flow control valve 14 in the third back pressure chamber B2. Thus, the flow control valve 14 is maintained in a state where the end portion closer to the third back pressure chamber B2 contacts the partition wall portion 51*c*.

In this manner, the flow of hydraulic oil in a direction out of the lift cylinder 5 is shut off by the on-off valve 12 and the check valve 39. This prevents the lift cylinder 5 from retracting and thus maintains the fork at a predetermined height. Since the path from the passage 34 to the switch valve side passage 33 is also shut off by the check valve 39, the lift cylinder 5 is prevented from retracting.

The process of switching the switch valve 11 from the neutral position to the supply position will be described. FIG. 2 illustrates the hydraulic control apparatus 1 in a state where the switch valve 11 is at the supply position. When the switch valve 11 is switched from the neutral position to the supply position, the spool 22 is displaced in a direction indicated by arrow D1 in FIG. 1. Thus, the hydraulic oil supplied from the pump 6 to the supply passage 36 is supplied to the switch valve side passage 33 through a communication passage 36*a* and a passage defined between the first land portion 22*a* of the spool 22 and the spool hole 23, as indicated by arrows in FIG. 2. At this time, the first tank passage 37 and the switch valve side passage 33 are kept disconnected from each other.

Then, the hydraulic pressure of the switch valve side passage 33 is increased, and an urging force generated by the increased hydraulic pressure acts on the check valve 39. When the urging force surpasses an urging force acting on the check valve 39 based on a spring and the hydraulic pressure of the cylinder side passage 32, the check valve 39 is opened. Accordingly, the switch valve side passage 33 and the cylinder side passage 32 are connected to each other by the (connection) passage 34, so that hydraulic oil is supplied to the cylinder side passage 32. Then, hydraulic oil is supplied to the lift cylinder 5 so that the fork is lifted.

In this state, the electromagnetic switch valve 82 is in a state to disconnect the first pilot line 81 and the first back pressure chamber A1 from each other. When receiving, from the hydraulic oil flowing in from the first through hole 51*f*, the second urging force, which is greater than the first urging force 1 from the first back pressure chamber A1, the on-off valve 12 separates from the valve seat 51*h* and opens. Thus, hydraulic oil is supplied to the cylinder side passage 32 from the switch valve side passage 33 through the communication passage X in the sleeve 51. Since the second pilot line 91 is shut off and the hydraulic pressure of the switch valve side passage 33 acts on the second back pressure chamber B1 of the flow control valve 14, the flow control valve 14 is urged toward the partition wall portion 51*c* (in a direction increasing the opening degree of the communication passage X). The flow control valve 14 is maintained to be contacting the partition wall portion 51*c*. Accordingly, the supply of hydraulic oil is executed with the maximum opening degree of the communication passage X.

Figure 11:
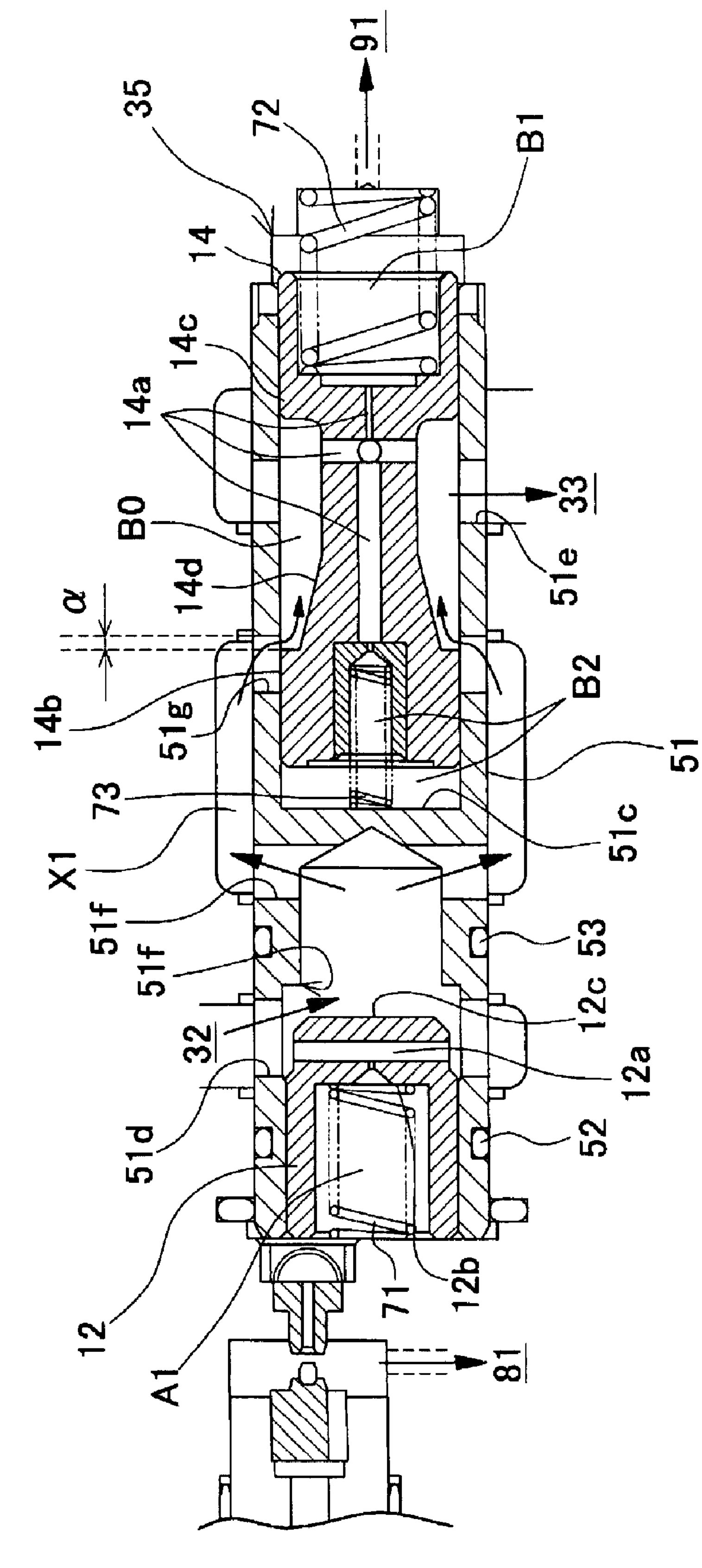
FIG. 11 is an enlarged view showing the valve body accommodation chamber of the hydraulic control apparatus of FIG. 3.
Figure 12:
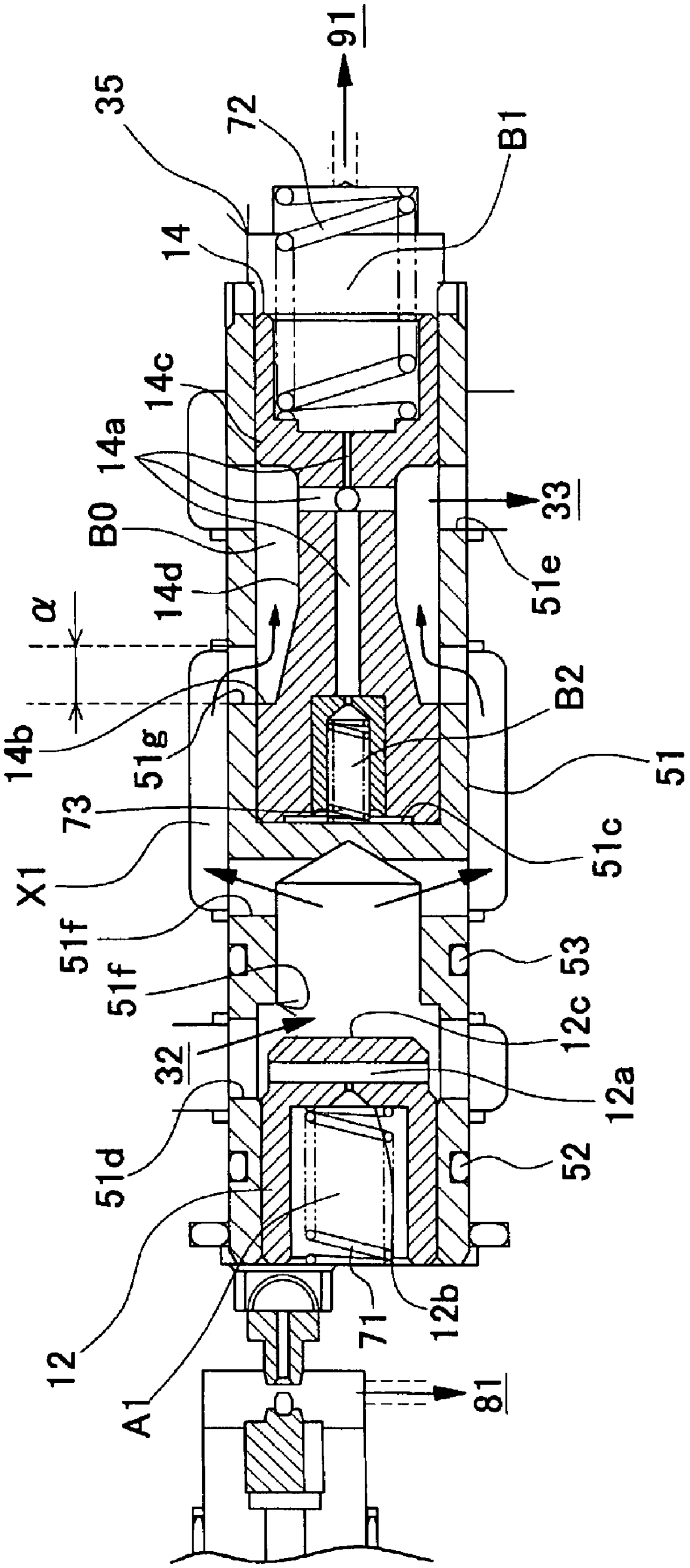
FIG. 12 is an enlarged view showing the valve body accommodation chamber of the hydraulic control apparatus of FIG. 4.

When the switch valve 11 is switched from the neutral position of FIG. 1 to the drainage position, the hydraulic control apparatus 1 operates as follows. FIG. 3 illustrates the hydraulic control apparatus 1 in a state where the switch valve 11 is at the drainage position when the load acting on the cylinder is great. The hydraulic control apparatus 1 of FIG. 3 is in a state where the fork is being lowered with a heavy cargo placed on it. FIG. 4 illustrates the hydraulic control apparatus 1 in a state where the switch valve 11 is at the drainage position when the load acting on the cylinder is small. The hydraulic control apparatus 1 of FIG. 4 is in a state where the fork is being lowered with no cargo placed on it. FIG. 11 is an enlarged view showing a part including the valve body accommodation chamber 35 in the state shown in FIG. 3. FIG. 12 is an enlarged view showing a part including the valve body accommodation chamber 35 in the state shown in FIG. 4.

When the switch valve 11 is switched from the neutral position to the drainage position, the spool 22 is displaced in a direction indicated by arrow D2 in FIG. 1. Accordingly, the switch valve side passage 33 and the first tank passage 37 are connected to each other through a passage defined between the first land portion 22*a* of the spool 22 and the spool hole 23.

When the switch valve 11 is switched to the drainage position, the electromagnetic switch valve 82 is switched to connect the first pilot line 81 to the first back pressure chamber A1. Therefore, hydraulic oil in the first back pressure chamber A1 can flow to the first pilot line 81. Then, as indicated by arrows in FIG. 3, hydraulic oil in the first back pressure chamber A1 is drained to the switch valve side passage 33 through the first pilot line 81. This lowers the pressure of the first back pressure chamber A1. That is, the pilot pressure, which is lower than the hydraulic pressure of the cylinder side passage 32, acts on the first back pressure chamber A1. Therefore, the second urging force of the hydraulic oil to the end portion 12*c* on the side of the partition wall portion 51*c* becomes greater than the first urging force generated by the hydraulic pressure of the first back pressure chamber A1 and the spring 71. This separates the on-off valve 12 from the valve seat 51*h*, which opens the communication passage X between the cylinder side passage 32 and the switch valve side passage 33. When the communication passage X is open, the hydraulic oil from the lift cylinder 5 is drained to the switch valve side passage 33 through the cylinder side passage 32 and the communication passage X as indicated by arrows in FIG. 3. The hydraulic oil is then drained to the tank 7 from the first tank passage 37. That is, the opening degree (represented by a in FIG. 1) of the second through hole 51*g* is adjusted by the large diameter portion 14*b* of the flow control valve 14, and the hydraulic oil is drained to the tank 7 through the second through hole 51*g*. Therefore, the fork is lowered in correspondence with the opening degree. Since the path from the passage 34 to the switch valve side passage 33 is shut off by the check valve 39, the hydraulic oil is not drained through the path.

Next, the operation of the flow control valve 14 when hydraulic oil is drained to the tank 7 will be described. When the switch valve 11 is switched from the neutral position to the drainage position, the spool 22 is displaced along the axial direction to a position at which the second land portion 22*b* corresponds to the opening 91*a* of the second pilot line 91. As the spool 22 is displaced further in the axial direction, the opening degree of the restrictor at the opening 91*a* is gradually increased. As the spool 22 is displaced in this manner, the opening degree of the restrictor at the opening 91*a* is adjusted. Accordingly, hydraulic oil is drained to the second tank passage 38 at a flow rate corresponding to the opening degree. When the spool 22 is displaced by a sufficient amount so that the opening 91*a* of the second pilot line 91 is fully open, the communication state between the second pilot line 91 and the second tank passage 38 is no longer changed.

When the switch valve 11 is switched to the drain position, hydraulic oil in the second back pressure chamber B1 is drained to the second tank passage 38 through the second pilot line 91 as indicated by arrows in FIG. 3. This lowers the pressure of the second back pressure chamber B1. That is, the pilot pressure, which is lower than the hydraulic pressure of the cylinder side passage 32, acts on the second back pressure chamber B1.

For example, when the load acting on the cylinder is great (see FIG. 3), for example, when a heavy cargo is placed on the fork, the hydraulic pressure of the cylinder side passage 32 is higher than the case where a small load is acting on the cylinder. Therefore, the hydraulic pressure of hydraulic oil flowing into the clearance B0 through the second through hole 51*g* is increased. At this time, the hydraulic pressure of the clearance B0 is conducted to the third back pressure chamber B2 through the pressure introduction line 14*a*, which increases the hydraulic pressure of the third back pressure chamber B2. Then, the equilibrium between the urging force from the second back pressure chamber B1 and the urging force from the third back pressure chamber B2 is disturbed. As a result, the flow control valve 14 is displaced away from the on-off valve 12. That is, as shown in FIG. 3, the flow control valve 14 is displaced such that the large diameter portion 14*b* reduces the opening degree α (see FIG. 11) of the second through hole 51*g*. This reduces the flow rate flowing into the clearance B0 from the second through hole 51*g*, and the hydraulic pressure of the clearance B0 is automatically adjusted such that urging forces acting on the both ends of the flow control valve 14 are equalized. Accordingly, the hydraulic pressure of the switch valve side passage 33 is adjusted to be constant. Thus, hydraulic oil is drained at a constant flow rate that corresponds to the opening degree of the passage defined between the first land portion 22*a* of the spool 22 and the spool hole 23. Therefore, even if the load acting on the cylinder is great and the hydraulic pressure of the cylinder side passage 32 is high, the drainage flow rate of the hydraulic oil to the tank 7 is not increased. Thus, compared to a case where the hydraulic pressure of the cylinder side passage 32 is low, the speed the fork being lowered is prevented from increasing, and the speed of the fork is maintained at a constant value.

For example, when the load acting on the cylinder is mall (see FIG. 4), for example, no cargo is placed on the fork, the hydraulic pressure of the cylinder side passage 32 is lowered. Therefore, the hydraulic pressure of hydraulic oil flowing into the clearance B0 through the second through hole 51*g* is lowered. At this time, the hydraulic pressure of the clearance B0 is conducted to the third back pressure chamber B2 through the pressure introduction line 14*a*, which equalizes the hydraulic pressure of the third back pressure chamber B2 to the hydraulic pressure of the clearance B0. When the urging force of the hydraulic pressure in the third back pressure chamber B2 and the spring 73 is smaller than the urging force in the second back pressure chamber B1, the resultant force acts to displace the flow control valve 14 toward the on-off valve 12. Thus, the flow control valve 14 is maintained to be contacting the partition wall portion 51*c*. That is, as shown in FIG. 4, the flow control valve 14 is located at a position where the opening degree α (see FIG. 12) of the second through hole 51*g* is maximized. Accordingly, even if the hydraulic pressure acting on the cylinder side passage 32 is low, the discharge flow rate is maintained high. Therefore, when no cargo is placed on the fork, the speed of the fork being lowered is prevented from being significantly slow.

The springs 72, 73, and the flow control valve controller 90 may be configured such that, when hydraulic oil is discharged with a small load acting on the cylinder, the flow control valve 14 does not contact the partition wall portion 51*c*, that is, the urging force of the second back pressure chamber B1 and the urging force of the third back pressure chamber B2 are in equilibrium without causing the urging force of the third back pressure chamber B2 to be less than the urging force of the second back pressure chamber B1. In this case, the hydraulic pressure of the clearance B0 is adjusted to a constant value that corresponds to the hydraulic pressure of the second back pressure chamber B1. Accordingly, the hydraulic pressure of the switch valve side passage 33 is adjusted to be constant. Thus, hydraulic oil is drained at a constant flow rate that corresponds to the opening degree of the passage defined between the first land portion 22*a* of the spool 22 and the spool hole 23. Therefore, even if the load acting on the cylinder is small and the hydraulic pressure of the cylinder side passage 32 is low, the flow rate of hydraulic oil drained to the tank 7 is not reduced, so that the speed of lowering of the fork is maintained constant.

Also, in a state where the switch valve 11 is at the drainage position and hydraulic oil is being drained from the lift cylinder 5 (when the fork is being lowered), if the hydraulic pressure of the switch valve side passage 33 is changed, the equilibrium between the urging force of the hydraulic pressure the second back pressure chamber B1 and the spring 72 and the urging force of the hydraulic pressure of the third back pressure chamber B2 and the spring 73 is instantaneously disturbed, which displaces the flow control valve 14. In accordance with the displacement of the flow control valve 14, the opening degree of the second through hole 51*g* is changed. When the hydraulic pressure of the switch valve side passage 33 is increased, the flow control valve 14 is displaced to decrease the opening degree (in a direction away from the partition wall portion 51*c*). When the hydraulic pressure of the switch valve side passage 33 is lowered, the flow control valve 14 is displaced to increase the opening degree (in a direction toward the partition wall portion 51*c*). Accordingly, the flow rate from the cylinder side passage 32 to the switch valve side passage 33 is changed, and the hydraulic pressure of the switch valve side passage 33 is adjusted. In this manner, the flow rate of hydraulic oil drained to the tank 7 is adjusted, so that the speed of lowering the fork is maintained constant.

As described above, according to the hydraulic control apparatus 1 of the present embodiment, when the switch valve 11 is at the neutral position, the hydraulic pressure of the cylinder side passage 32 acts on the first back pressure chamber A1 of the on-off valve 12 such that the on-off valve 12 is urged to disconnect the cylinder side passage 32 and the switch valve side passage 33 from each other. The on-off valve 12 is thus maintained in a state to shut off the cylinder side passage 32 and the switch valve side passage 33 from each other when the switch valve 11 is at the neutral position. Therefore, the drainage of hydraulic oil from the lift cylinder 5 is restricted. This prevents the lift cylinder 5 from retracting (i.e., from lowering due to the own weight). That is, when at the neutral position, the switch valve 11 functions as an operated check valve.

When the switch valve 11 is switched from the neutral position to the drainage position, the first pilot pressure, which is lower than the hydraulic pressure of the cylinder side passage 32, acts on the first back pressure chamber A1 of the on-off valve 12. This weakens the urging force of the on-off valve 12 from the first back pressure chamber A1, thereby switching the on-off valve 12 from the closed state to the open state (a state in which the communication passage X is open), so that hydraulic oil is drained from the lift cylinder 5 to the tank 7.

When the switch valve 11 is at the drainage position, the second pilot pressure, which is lower than the hydraulic pressure of the cylinder side passage 32, acts on the second back pressure chamber B1. When the flow control valve 14 is displaced in the fluid chamber B as the hydraulic pressure of the clearance B0 and the switch valve side passage 33 fluctuates, the opening degree of a passage of fluid flowing into the clearance B0 from the second though hole 51*g* is changed in accordance with the displacement of the flow control valve 14. In this manner, the on-off valve 12 also functions as a flow regulator that adjusts the flow rate of fluid drained from the lift cylinder 5.

Since the on-off valve 12, which functions as an operated check valve, and the flow control valve 14, which functions as a flow regulator, are arranged in the valve body accommodation chamber 35, which is formed extend along a straight line, the space for the components in the hydraulic control apparatus 1 is efficiently used. Therefore, without increasing the size of the hydraulic control apparatus 1, that is, while adopting a compact configuration, the function of an operated check valve and a flow regulator for adjusting the flow rate of drainage are achieved. Also, the shape of the valve body accommodation chamber 35 is simplified, so that the valve body accommodation chamber 35 is easily formed.

The on-off valve 12 is controlled by the on-off valve controller 80, and the flow control valve 14 is controlled by the flow control valve controller 90. That is, the on-off valve 12 and the flow control valve 14 are controlled by controllers independent from each other. Therefore, shutting off of the communication passage X by the on-off valve 12 is not influenced by the operation of the flow control valve 14, and such shutting off is performed in a stable manner.

When the switch valve 11 is at the supply position, the flow control valve controller 90 causes the fluid pressure of the switch valve side passage 33 to act on the second back pressure chamber B1, thereby urging the flow control valve 14 to increase the opening degree. This increases the opening degree when fluid is supplied to a bottom chamber of the cylinder from the pump 6, which reduces the pressure loss. This allows the cylinder to be efficiently operated.

When the switch valve 11 is at the drainage position, since the first pilot pressure, which is applied to the first back pressure chamber A1 by the on-off valve controller 80, and the second pilot pressure, which is applied to the second back pressure chamber B1 by the flow control valve controller 90, are fluid pressures conducted through different passages, the operation of the on-off valve 12 when the first pilot pressure is acting on the first back pressure chamber A1 is not influenced by whether the second pilot pressure is being applied to the second back pressure chamber B1 by the flow control valve controller 90. Likewise, the operation of the flow control valve 14 when the second pilot pressure is applied to the second back pressure chamber B1 is not influenced by whether the first pilot pressure is being applied to the first back pressure chamber A1 by the on-off valve controller 80. Therefore, the adjustment of the opening degree of the communication passage X by the on-off valve 12 and the flow rate adjustment by the flow control valve 14 are stably performed.

The on-off valve controller 80 includes the first pilot line 81, which connects the first back pressure chamber A1 to the switch valve side passage 33, and the electromagnetic switch valve 82. When the switch valve 11 is at the neutral position or the supply position, the electromagnetic switch valve 82 shuts off the first pilot line 81. When the switch valve 11 is at the drainage position, the electromagnetic switch valve 82 opens the first pilot line 81. Since fluid flowing through the cylinder side passage 32 is drained to the switch valve side passage 33 after passing through the flow control valve 14, the pressure of the fluid in the switch valve side passage 33 is lower than the fluid pressure of the cylinder side passage 32. Thus, by conducting the fluid pressure of the switch valve side passage 33 to the first back pressure chamber A1 through the first pilot line 81, the first pilot pressure, which is lower than the fluid pressure of the cylinder side passage 32 is caused to act on the first back pressure chamber A1 with a simple configuration.

The switch valve 11 is a spool valve, which is switched in accordance with displacement of the spool 22. The flow control valve controller 90 has the second pilot line 91. The second pilot line 91 is opened to the spool hole 23, in which the spool 22 is arranged to be displaced. As the spool 22 is displaced when the switch valve 11 is switched to the drainage position, the second pilot line 91 connects the second back pressure chamber B1 to the tank 7. When the switch valve 11 is switched to the drainage position, the opening 91*a* of the second pilot line 91, which corresponds to the second land portion 22*b*, is gradually enlarged as the spool 22 is displaced in the spool hole 23. Accordingly, the state of communication between the second back pressure chamber B1 and the tank 7 is gradually changed. Therefore, the second pilot pressure applied to the second back pressure chamber B1 can be finely adjusted, and the displacement amount of the flow control valve 14 thus can be adjusted. As a result, it is possible to adjust the drainage flow rate by adjusting the displacement amount of the spool 22.

The cylindrical sleeve 51 is fixed to the valve body accommodation chamber 35. The partition wall portion 51*c* divides the interior of the sleeve 51 into a zone in which the on-off valve 12 is located and a zone in which the flow control valve 14 is located. Since the position of the partition wall portion 51*c* fixed with respect to the valve body accommodation chamber 35, the sleeve 51, which forms a back pressure chamber for accommodating the flow control valve 14, is easily formed.

Since the second connection passage X1 connecting the fluid chamber A in the on-off valve 12 and the fluid chamber in the flow control valve 14 to each other is formed outside of the sleeve 51 (between the outer circumference of the sleeve 51 and the inner wall of the valve body accommodation chamber 35), the space in the sleeve 51 is effectively used. For example, the sizes of the on-off valve 12 and the flow control valve 14, which are located in the sleeve 51, can be increased. This increases the pressure receiving areas, and thus stabilizes the operation.

The seal ring 52 is located on the outer circumferential surface of the sleeve 51 between the cylinder side through hole 51*d* of the sleeve 51 and the end of the sleeve 51 located close to the first back pressure chamber A1. The seal ring 52 contacts the inner wall of the valve body accommodation chamber 35. This suppresses the flow of hydraulic oil from the cylinder side passage 32 to the first back pressure chamber A1 through between the sleeve 51 and the inner wall of the valve body accommodation chamber 35. The opening operation of the on-off valve 12 is smoothly performed.

The seal ring 53 is located on the outer circumferential surface of the sleeve 51 between the cylinder side through hole 51*d* and the first through hole 51*f*. The seal ring 53 contacts the inner wall of the valve body accommodation chamber 35. In a state where the communication passage X is shut off by the on-off valve 12, the cylinder side through hole 51*d* and the first through hole 51*f* are prevented from being connected to each other through between the outer circumference of the sleeve 51 and the inner wall of the valve body accommodation chamber 35. This reliably prevents the lift cylinder 5 from retracting (i.e., from lowering due to the own weight).

The damper mechanism 60 is located at an end of the flow control valve 14, which faces the third back pressure chamber B2. The damper mechanism 60 makes the flow resistance when fluid is drained from the third back pressure chamber B2 greater than the flow resistance when fluid flows into the third back pressure chamber B2. Therefore, compared to the displacement speed of the flow control valve 14 when the flow control valve 14 is displaced in a direction increasing the volume of the third back pressure chamber B2, the displacement speed of the flow control valve 14 when the flow control valve 14 is displaced in a direction reducing the volume of the third back pressure chamber B2 is made smaller. As a result, hydraulic pulsation that may be generated through displacement of the flow control valve 14 is attenuated. Also, the impact caused when the end of the flow control valve 14 contacts the sleeve 51 is reduced.

The cylinder side passage 32 and the switch valve side passage 33 are connected to each other by the (connection) passage 34, which is formed as a path independent from a path including the communication passage X. Thus, when the switch valve 11 is switched to the supply position, fluid from the pump 6 is supplied to the cylinder side passage 32 through the first connection passage 34. Therefore, when the switch valve 11 is switched to the supply position, hydraulic oil is supplied to the cylinder side passage 32 through the first connection passage 34 without flowing through the path the opening degree of which is adjusted by the flow control valve 14 and the path that is opened and closed by the on-off valve 12. That is, by simplifying the first connection passage 34, the pressure loss of fluid supplied to the single action cylinder is reduced. The control of the flow control valve 14 and the on-off valve 12 is unlikely to be influenced by the operating state of the flow control valve 14 and the on-off valve 12 when the switch valve 11 is switched to the supply position, the control of the flow control valve 14 and the on-off valve 12 can be performed with a simple structure.

The present invention is not limited to the above described embodiment, but may be modified as follows.

In the illustrated embodiment, the present invention is applied to a hydraulic control apparatus for actuating the lift cylinder 5 for lifting and lowering the fork of a forklift. However, the present invention may be applied to any hydraulic control apparatus for other types of single action cylinders.

The shapes of the valve body accommodation chamber 35, the flow control valve 14, and the on-off valve 12 are not limited to those in the illustrated embodiment, but may be changed as necessary.

The first pilot line of the on-off valve controller is not limited to a pilot line that conducts fluid pressure of the switch valve side passage to the first back pressure chamber. The first pilot line may have any structure as long as the first pilot line is capable of generating a pilot pressure that is lower than the hydraulic pressure of the cylinder side passage 32 and conducts the generated pilot pressure to the first back pressure chamber. For example, a restrictor passage may be located downstream (toward the switch valve side passage) from a position at which the on-off valve is located in the communication passage, and the first pilot line may have an opening located downstream of the restrictor passage. In this case, the fluid pressure of a section downstream of the restrictor passage is conducted to the first back pressure chamber.

The electromagnetic switch valve 82 (first switching portion), which opens and closes the first pilot line, does not need to be an electromagnetic valve. For example, the pilot pressure generating portion may be formed by a switch valve of a hydraulic pilot type instead of an electromagnetic switch valve. When a hydraulic pressure pilot type switch valve is used, the first switching portion is switched without using electrical wiring.

The switch valve 11 may be an electromagnetic proportional control valve. In this case, the hydraulic control apparatus 1 is configured as an electromagnetic hydraulic control system.

What is claimed is:

1. A hydraulic control apparatus for a single-action cylinder, comprising:

a switch valve for controlling supply and drainage of a fluid with respect to the cylinder, the switch valve being switched among a supply position for supplying the fluid to the cylinder, a drainage position for draining the fluid from the cylinder, and a neutral position for preventing the supply and the drainage of the fluid with respect to the cylinder;

a cylinder side passage connected to the cylinder;

a switch valve side passage connected to the switch valve;

a valve body accommodation chamber linearly extending between the cylinder side passage and the switch valve side passage, the accommodation chamber having a first end and a second end, wherein, in a portion corresponding to the first end, the accommodation chamber has a cylinder side opening that opens to the cylinder side passage, and wherein, in a portion corresponding to the second end, the accommodation chamber has a switch valve side opening that opens to the switch valve side passage;

an on-off valve displaceably located in a vicinity of the first end of the valve body accommodation chamber, the on-off valve defining a first back pressure chamber in a vicinity of the first end, wherein the on-off valve is capable of shutting off a communication passage that extends from the cylinder side passage to the switch valve side passage through the valve body accommodation chamber;

a flow control valve displaceably located in a vicinity of the second end of the valve body accommodation chamber, the flow control valve defining a second back pressure chamber in a vicinity of the second end, wherein the flow control valve is capable of shutting off the communication passage in accordance with displacement of the flow control valve;

a partitioning member fixed in the valve body accommodation chamber, the partitioning member partly separates the on-off valve and the flow control valve from each other, wherein the partitioning member defines a third back pressure chamber, which is a back pressure chamber for the flow control valve;

a first controller for controlling operation of the on-off valve, wherein, when the switch valve is at the neutral position or the supply position, the first controller causes a fluid pressure of the cylinder side passage to act on the first back pressure chamber, thereby urging the on-off valve in a direction for shutting off the communication passage, wherein, when the switch valve is at the drainage position, the first controller causes a first pilot pressure, which is lower than the fluid pressure of the cylinder side passage, to the first back pressure chamber; and a second controller for controlling operation of the flow control valve, wherein, when the switch valve is at the drainage position, the second controller causes a second pilot pressure, which is lower than the fluid pressure of the cylinder side passage, to act on the second back pressure chamber.

2. The hydraulic control apparatus according to claim 1, wherein the apparatus is connected to a pump and a tank, wherein, when the switch valve is switched to the supply position, the fluid sent from the pump is allowed to flow into the switch valve side passage, wherein, when the switch valve is switched to the drainage position, the fluid is allowed to be drained from the switch valve side passage to the tank, and wherein, when the switch valve is switched to the neutral position, the switch valve side passage is shut off from the pump and tank.

3. The hydraulic control apparatus according to claim 2, wherein, when the switch valve is at the supply position, the second controller causes a fluid pressure of the switch valve side passage to act on the second back pressure chamber, thereby urging the flow control valve in a direction for increasing the opening degree of the communication passage.

4. The hydraulic control apparatus according to claim 2, wherein the first pilot pressure, which is caused by the first controller to act on the first back pressure chamber when the switch valve is at the drainage position, and the second pilot pressure, which is caused by the second controller to act on the second back pressure chamber, are conducted through different passages.

5. The hydraulic control apparatus according to claim 4, wherein the first controller includes:

a first pilot line for connecting the first back pressure chamber to the switch valve side passage; and a first switching portion that shuts off and opens the first pilot line, wherein, when the switch valve is at the neutral position or the supply position, the first switching portion shuts off the first pilot line, and wherein, when the switch valve is at the drainage position, the first switching portion opens the first pilot line.

6. The hydraulic control apparatus according to claim 4, wherein the switch valve is a spool valve that has a spool hole and a spool displaceably located in the spool hole, wherein the second controller includes a second pilot passage opened to the spool hole, wherein, as the spool is displaced when the switch valve is switched to the drainage position, the second pilot line gradually connects the second back pressure chamber to the tank.

7. The hydraulic control apparatus according to claim 2, further comprising a first connection passage that connects the cylinder side passage and the switch valve side passage through a path different from the path via the communication passage, wherein, when the switch valve is switched to the supply position, the first connection passage allows fluid to be supplied from the pump to the cylinder side passage.

8. The hydraulic control apparatus according to claim 1, wherein the partitioning member is a cylindrical sleeve inserted into the valve body accommodation chamber, wherein the sleeve accommodates the on-off valve and the flow control valve, the sleeve including:

a partition wall that divides the interior of the sleeve into a first fluid chamber for accommodating the on-off valve and a second fluid chamber for accommodating the flow control valve;

a cylinder side through hole for connecting the first fluid chamber to the cylinder side passage;

a switch valve side through hole for connecting the second fluid chamber to the switch valve side passage; and a second connection passage being capable of connecting the first fluid chamber and the second fluid chamber to each other, wherein the second connection passage includes a first through hole opened to the first fluid chamber, a second through hole opened to the second fluid chamber, and an outer circumferential passage formed between an outer circumference of the sleeve and an inner wall of the valve body accommodation chamber, wherein the first through hole and the second through hole are opened to the circumferential passage, and wherein the on-off valve and the flow control valve are arranged to be displaced on an axis of the sleeve along an inner wall of the sleeve.

9. The hydraulic control apparatus according to claim 1, further comprising a damper mechanism located at an end of the flow control valve that faces the third back pressure chamber, wherein the damper mechanism includes a check passage and a restrictor passage, the check passage having a check valve that only allows fluid to flow into the third back pressure chamber, and the restrictor passage connecting the third back pressure chamber to an exterior of the third back pressure chamber.

* * * * *

UNITED STATES PATENT AND TRADEMARK OFFICE

CERTIFICATE OF CORRECTION

PATENT NO. : 7,650,907 B2
APPLICATION NO. : 11/894508
DATED : January 26, 2010
INVENTOR(S) : Tetsuya Goto et al.

It is certified that error appears in the above-identified patent and that said Letters Patent is hereby corrected as shown below:

At column 11, line 50, after “second back pressure chamber”, delete “BE” and substitute therefore --B1--.

Signed and Sealed this
Seventeenth Day of January, 2012

David J. Kappos
*Director of the United States Patent and Trademark Office*